(12) United States Patent
Takeuchi

(10) Patent No.: US 11,622,037 B2
(45) Date of Patent: *Apr. 4, 2023

(54) COMMUNICATION APPARATUS

(71) Applicant: BROTHER KOGYO KABUSHIKI KAISHA, Aichi (JP)

(72) Inventor: Shun Takeuchi, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 115 days.

This patent is subject to a terminal disclaimer.

(21) Appl. No.: 17/340,760

(22) Filed: Jun. 7, 2021

(65) Prior Publication Data

US 2021/0297523 A1 Sep. 23, 2021

Related U.S. Application Data

(63) Continuation of application No. 16/567,317, filed on Sep. 11, 2019, now Pat. No. 11,064,066, which is a
(Continued)

(30) Foreign Application Priority Data

Mar. 27, 2015 (JP) .............................. JP2015-066066

(51) Int. Cl.
*H04M 1/72412* (2021.01)
*H04W 52/02* (2009.01)

(52) U.S. Cl.
CPC ... *H04M 1/72412* (2021.01); *H04W 52/0229* (2013.01); *Y02D 30/70* (2020.08)

(58) Field of Classification Search
None
See application file for complete search history.

(56) References Cited

U.S. PATENT DOCUMENTS

2007/0037610 A1 2/2007 Logan
2011/0070837 A1 3/2011 Griffin et al.
(Continued)

FOREIGN PATENT DOCUMENTS

JP 2001-101351 A 4/2001
JP 2013-214139 A 10/2013
JP 2014-197767 A 10/2014

OTHER PUBLICATIONS

"Wi-Fi Peer-to-Peer (P2P) Technical Specification", Wi-Fi Alliance Technical Committee P2P Task Group, Oct. 4, 2010, 159 pages, Version 1.1.

(Continued)

*Primary Examiner* — Ernest G Tacsik
(74) *Attorney, Agent, or Firm* — Scully Scott Murphy and Presser

(57) ABSTRACT

A communication apparatus may perform: receiving a specific signal from a first external apparatus via a second interface; changing a state of a first interface from a first state to a second state, in a case where the specific signal including predetermined information is received via the second interface while the state of the first interface is the first state; maintaining the state of the first interface in the first state, in a case where the specific signal not including the predetermined information is received while the state of the first interface is the first state; and performing a communication of target data with the first external apparatus via the first interface being in the second state, after the state of the first interface has been changed to the second state.

27 Claims, 12 Drawing Sheets

Related U.S. Application Data continuation of application No. 15/822,851, filed on Nov. 27, 2017, now Pat. No. 10,419,592, which is a continuation of application No. 15/080,765, filed on Mar. 25, 2016, now Pat. No. 9,832,302.

(56) References Cited

U.S. PATENT DOCUMENTS

| | | |
|---|---|---|
| 2012/0069827 A1 | 3/2012 | Lee et al. |
| 2013/0258390 A1 | 10/2013 | Suzuki et al. |
| 2013/0260682 A1 | 10/2013 | Suzuki et al. |
| 2013/0260683 A1 | 10/2013 | Suzuki et al. |
| 2013/0260818 A1 | 10/2013 | Suzuki et al. |
| 2013/0326495 A1 | 12/2013 | Reunamaki et al. |
| 2014/0188348 A1 | 7/2014 | Guatama et al. |
| 2014/0287690 A1 | 9/2014 | Kim |
| 2014/0293328 A1 | 10/2014 | Wakizaka et al. |
| 2014/0323048 A1 | 10/2014 | Kang |
| 2015/0126117 A1 | 5/2015 | Wong et al. |
| 2015/0317116 A1 | 11/2015 | Suzuki et al. |
| 2015/0350813 A1 | 12/2015 | Prats et al. |
| 2016/0029148 A1 | 1/2016 | Jackson et al. |
| 2016/0081019 A1 | 3/2016 | Pujari et al. |
| 2016/0316511 A1 | 10/2016 | Suzuki et al. |
| 2017/0026544 A1 | 1/2017 | Suzuki et al. |
| 2017/0366702 A1 | 12/2017 | Suzuki et al. |
| 2019/0215908 A1 | 7/2019 | Suzuki et al. |

OTHER PUBLICATIONS

Office Action dated Feb. 24, 2017 received in related U.S. Appl. No. 15/080,765.
Notice of Allowance dated Jul. 27, 2017 received in related U.S. Appl. No. 15/080,765.
Office Action dated May 9, 2018 received in related U.S. Appl. No. 15/822,851.
Office Action dated Nov. 28, 2018 received in related U.S. Appl. No. 15/822,851.
Notice of Allowance dated Mar. 12, 2019 received in related U.S. Appl. No. 15/822,851.
Notification of Reasons for Rejection dated Aug. 21, 2018 received from the Japanese Patent Office in related JP 2015-066066 together with English language translation.
Office Action dated Jan. 30, 2020 received in related U.S. Appl. No. 16/567,317.
Office Action dated Jul. 14, 2020 received in related U.S. Appl. No. 16/567,317.
Notice of Allowance dated Feb. 22, 2021 received in related U.S. Appl. No. 16/567,317.

(First Embodiment, Second Embodiment)

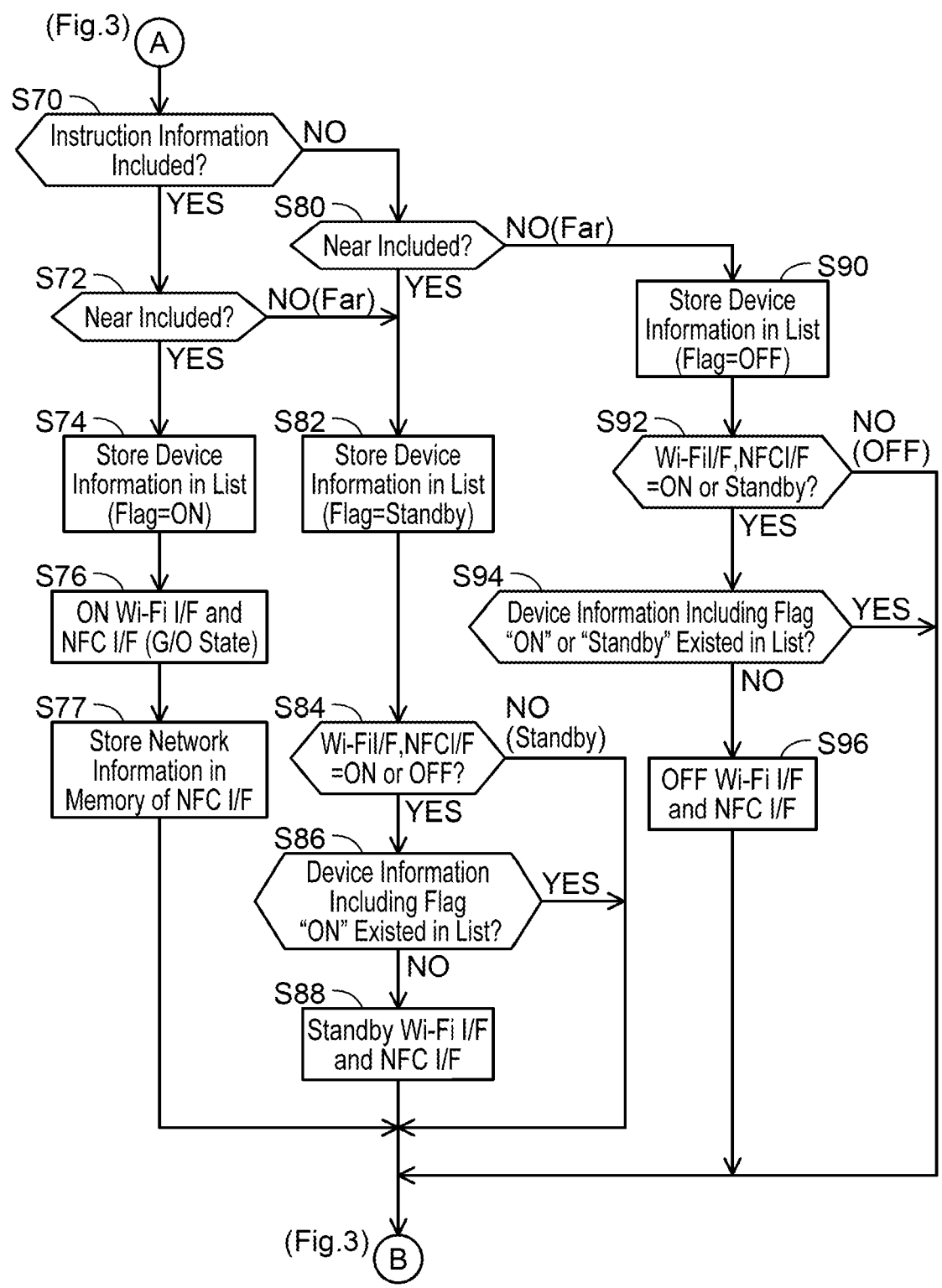

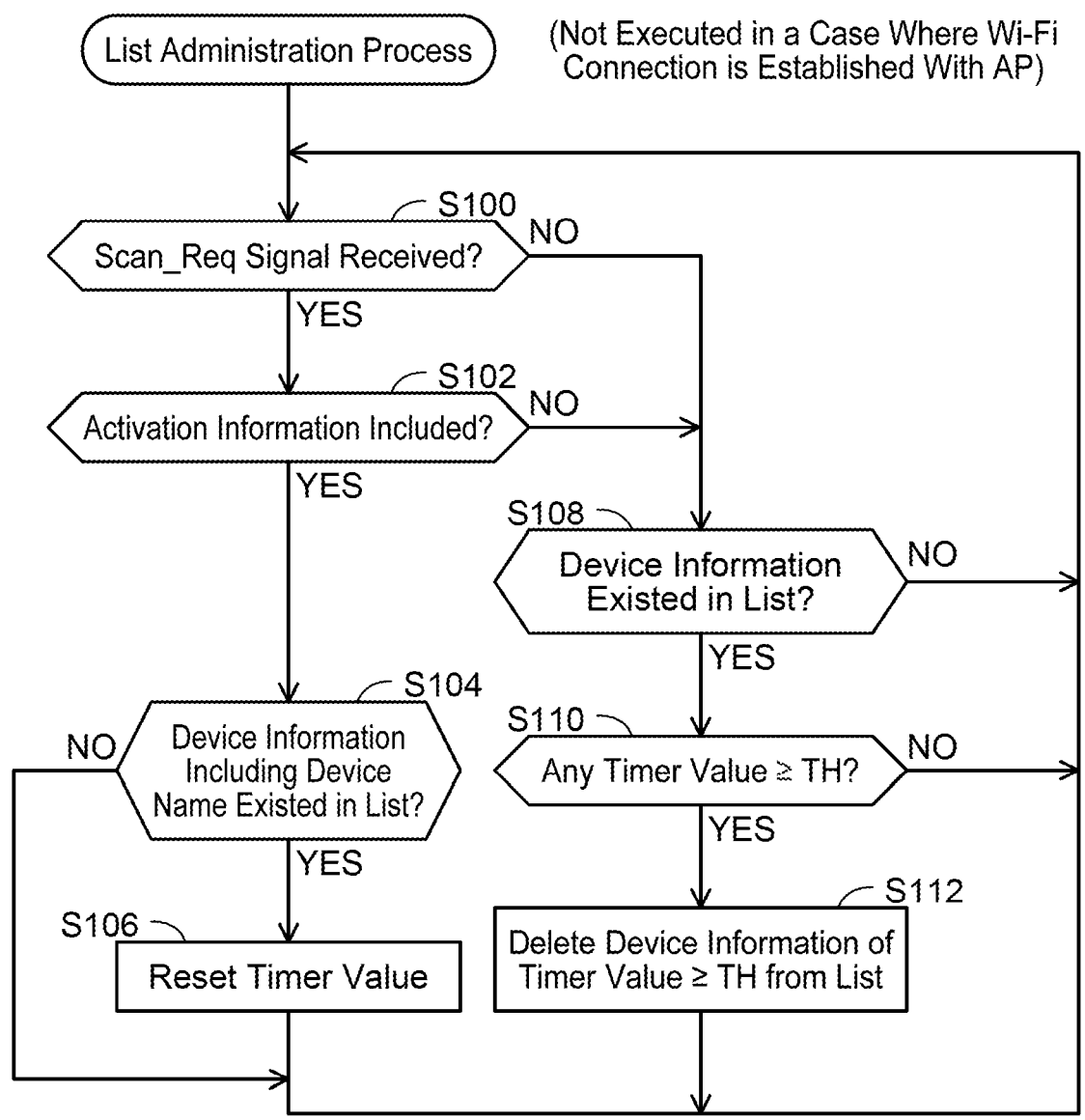

FIG. 6

(Flags of First Embodiment)

| | Near | Far | No Response |
|---|---|---|---|
| Instruction Information Present (Print Instructed) | ON | Standby | - |
| Activation Information Present (Application Program Already Activated) | Standby | OFF | - |
| Activation Information Absent (Application Program Not Activated) | OFF | OFF | - |

(Flags of Second Embodiment)

| | Near | Far | No Response |
|---|---|---|---|
| Instruction Information Present (Print Instructed) | ON | ON | - |
| Activation Information Present (Application Program Already Activated) | Standby | Standby | - |
| Activation Information Absent (Application Program Not Activated) | OFF | OFF | - |

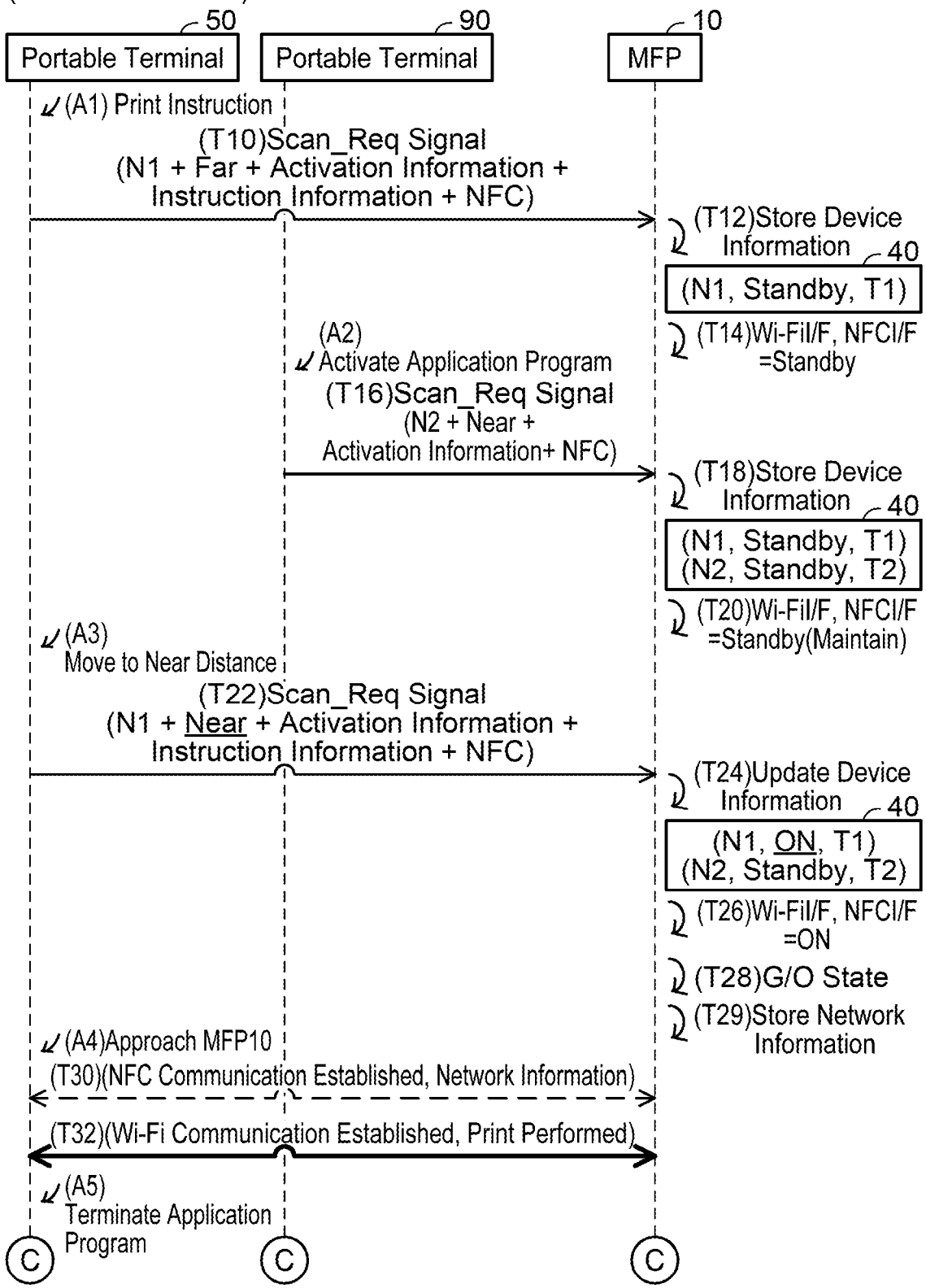

(First Embodiment)

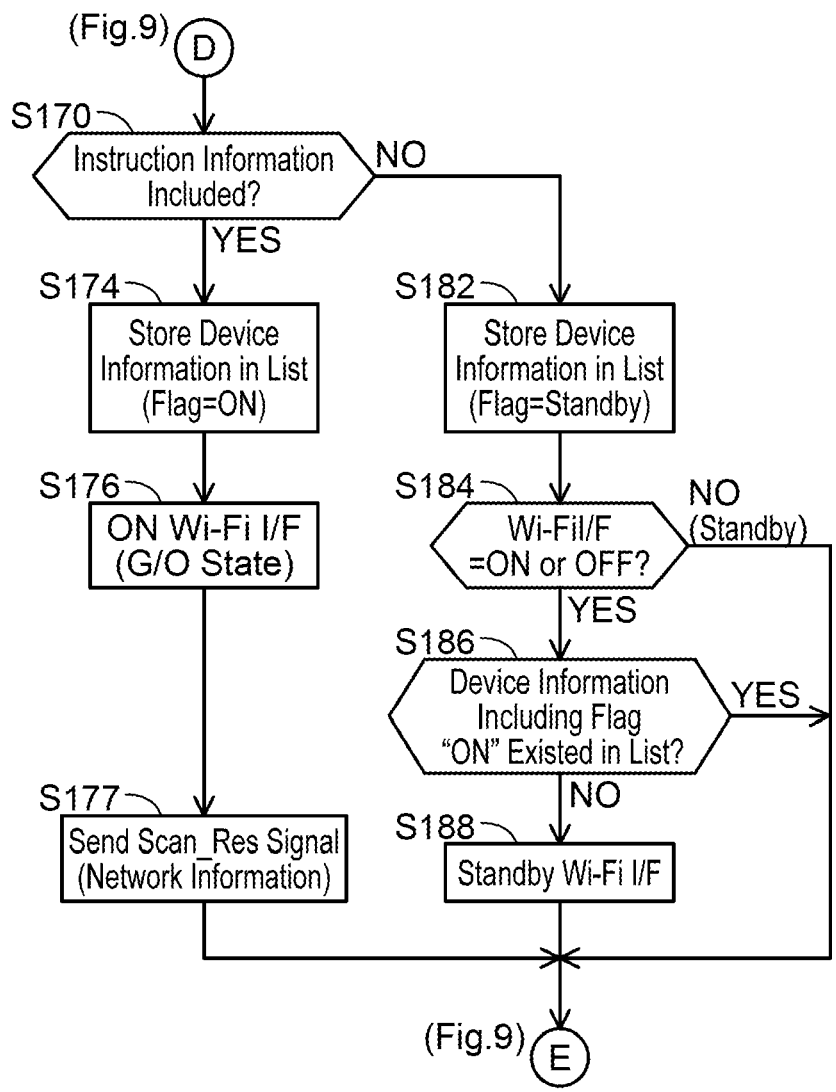

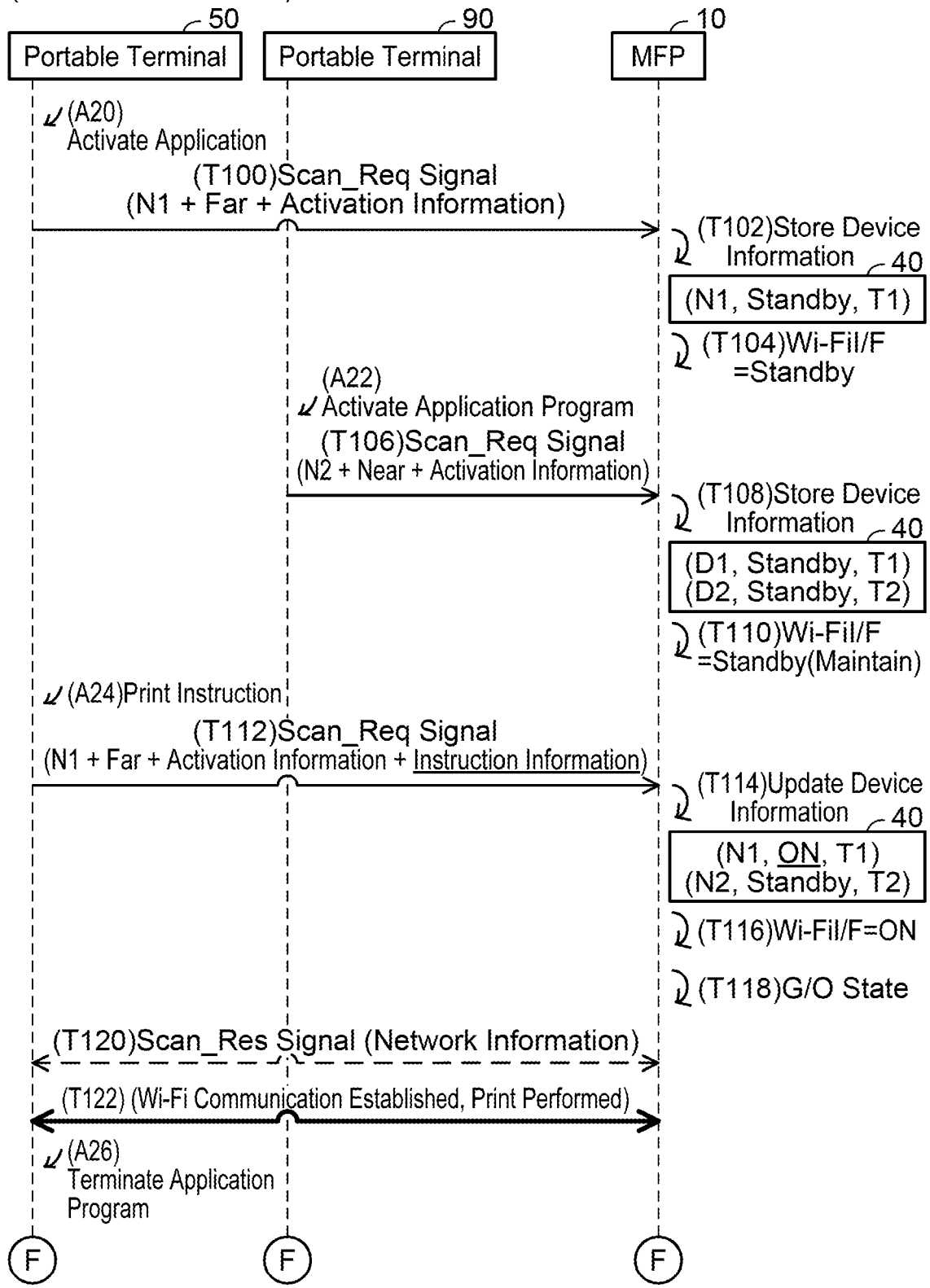

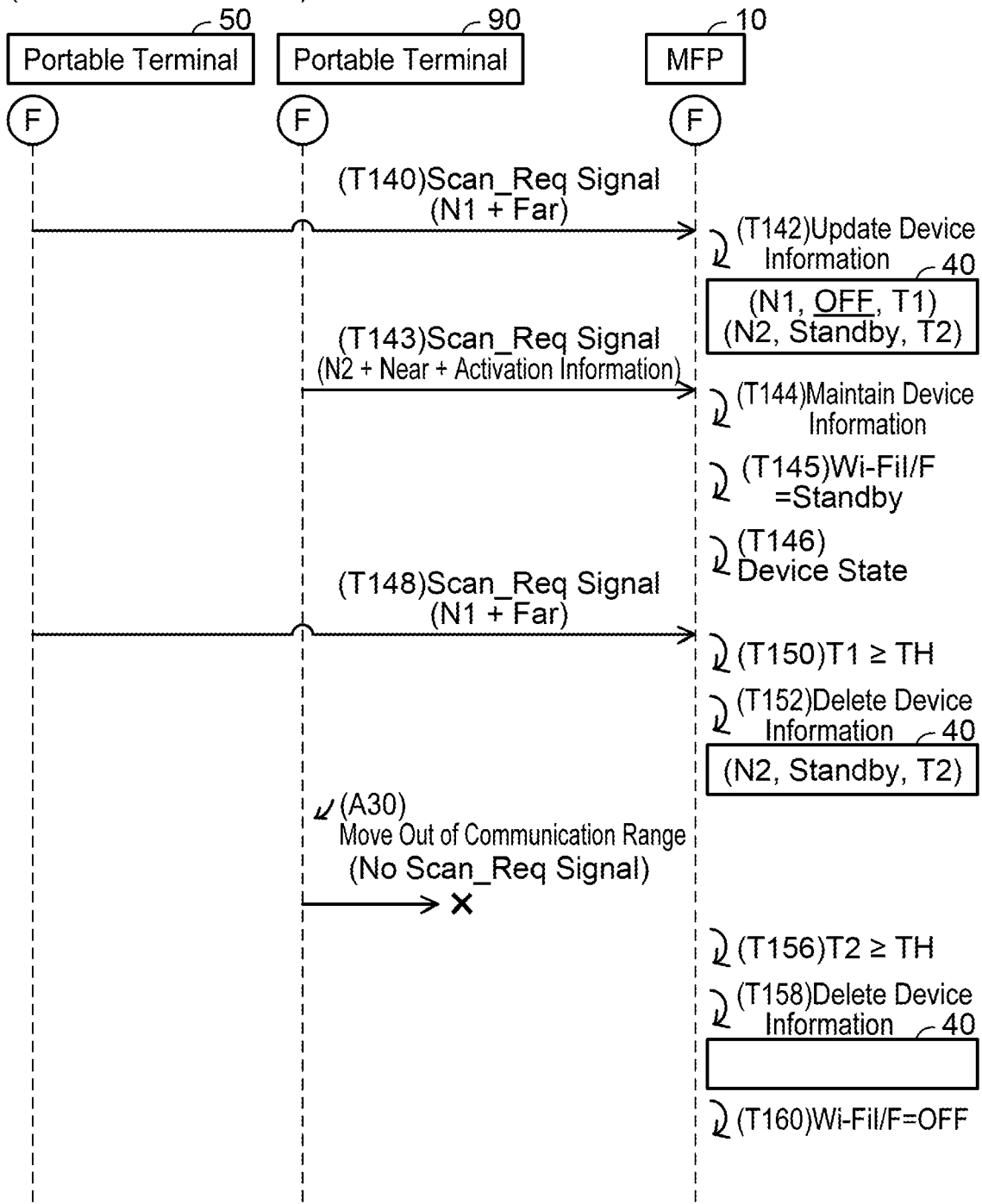

COMMUNICATION APPARATUS

CROSS-REFERENCE TO RELATED APPLICATIONS

This application is a continuation application of U.S. Ser. No. 16/567,317 filed Sep. 11, 2019, which is a continuation application of U.S. Ser. No. 15/822,851 filed Nov. 27, 2017, now U.S. Pat. No. 10,419,592, which is a continuation application of U.S. Ser. No. 15/080,765 filed Mar. 25, 2016, now U.S. Pat. No. 9,832,302 and claims priority to Japanese Patent Application No. 2015-066066, filed on Mar. 27, 2015, the entire contents of each of which are hereby incorporated by reference into the present application.

TECHNICAL FIELD

The technology disclosed herein relates to a communication apparatus for performing the communication of target data with an external apparatus.

DESCRIPTION OF RELATED ART

A reader is known that turns ON the power source of a controller and a RF (abbreviation of Radio Frequency) transmission-reception unit when a card detection unit detects an IC (abbreviation of Integrated Circuit) card. The reader can perform a communication with the IC card in the case where the power source of the controller and the RF transmission-reception unit has been turned ON.

SUMMARY

In the above technology, both of the controller and the RF transmission-reception unit are turned ON when the card detection unit detects an IC card regardless of the status of the IC card. The present specification discloses a technology that enables a communication apparatus to realize power saving by setting an interface to an appropriate state in accordance with the condition of an external apparatus.

A communication apparatus may comprise: a first interface configured to perform a wireless communication in accordance with a first communication scheme, and to be set in one state among a plurality of states including a first state and a second state that has higher power consumption than that of the first state; a second interface configured to perform a wireless communication in accordance with a second communication scheme different from the first communication scheme, the second interface having lower power consumption than that of the first interface being in the second state; a processor; and a memory storing computer-readable instructions therein, the computer-readable instructions, when executed by the processor, causing the communication apparatus to perform: receiving a specific signal via the second interface from a first external apparatus; changing a state of the first interface from the first state to the second state, in a case where the specific signal including predetermined information is received via the second interface while the state of the first interface is the first state; maintaining the state of the first interface in the first state, in a case where the specific signal not including the predetermined information is received while the state of the first interface is the first state; and performing a communication of target data with the first external apparatus via the first interface being in the second state, after the state of the first interface has been changed to the second state.

A control method and computer-readable instructions for implementation of the communication apparatus, and a non-transitory computer-readable recording medium in which the computer-readable instructions are stored, are also novel and useful. Further, a communication system comprising the above communication apparatus and an external apparatus (e.g. first external apparatus, second external apparatus, etc.) is also novel and useful.

BRIEF DESCRIPTION OF DRAWINGS

FIG. 4 shows a continuation of the flowchart of FIG. 3;

FIG. 5 shows a flowchart of a list administration process executed by the controller of the MFP;

FIG. 6 shows a table representing, for each condition, a content of a flag included in device information in the first embodiment and a second embodiment;

FIG. 7 shows a sequence chart of one example of a process executed by the communication system of the first embodiment;

FIG. 10 shows a continuation of the flowchart of FIG. 9;

FIG. 11 shows a sequence chart of one example of a process executed by the communication system of the second embodiment; and FIG. 12 shows a continuation of the sequence chart of FIG. 11.

EMBODIMENT

Figure 1:
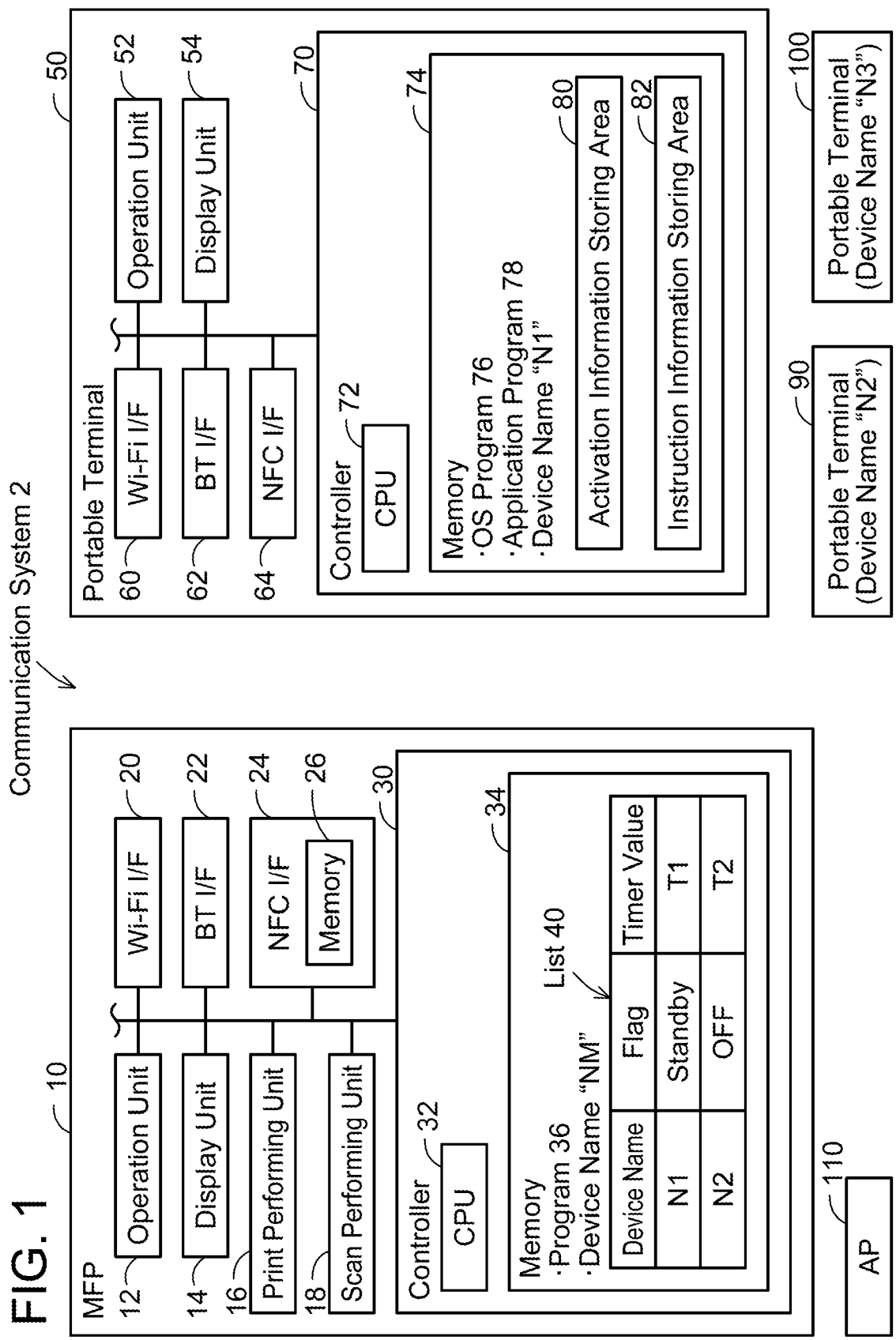
FIG. 1 shows a configuration of a communication system.

First Embodiment (Configuration of Communication System 2; FIG. 1)

As shown in FIG. 1, a communication system 2 comprises a MFP (abbreviation of multi-function peripheral) 10, a plurality of portable terminals 50, 90, and 100, and an AP (abbreviation of access point) 110. In FIG. 1, the MFP 10 and the portable terminals 50, 90, and 100 can perform a wireless communication with one another either via the AP 110 or not via the AP 110.

(Configuration of MFP 10)

The MFP 10 is a peripheral apparatus that is capable of performing various functions such as printing, scanning etc., that is, MFP 10 is the peripheral apparatus of the portable terminal 50 etc. The MFP 10 comprises an operation unit 12, a display unit 14, a print performing unit 16, a scan performing unit 18, a Wi-Fi interface 20, a BT (abbreviation of Bluetooth (registered trademark)) interface 22, an NFC (abbreviation of Near Field Communication) interface 24, and a controller 30. The units 12 to 30 are connected to a bus line (reference sign omitted). Hereinbelow, interface will be referred to as "I/F".

The operation unit 12 comprises a plurality of keys. A user can input various instructions into the MFP 10 by operating the operation unit 12. The display unit 14 is a display for displaying various types of information. The display unit 14 also functions as a so-called touch panel (i.e. also functions as an operation unit). The print performing unit 16 is a printing mechanism such as an inkjet system or laser system. The scan performing unit 18 is a scanning mechanism such as a CCD (abbreviation of Charge Coupled Device) or a CIS (abbreviation of Contact Image Sensor).

The Wi-Fi I/F 20 is an I/F for performing a wireless communication according to a Wi-Fi scheme (hereinafter called "Wi-Fi communication"). The Wi-Fi scheme, for example, is a wireless communication scheme based on IEEE (abbreviation of the Institute of Electrical and Electronics Engineers, Inc.) standard 802.11, and standards conforming thereto (e.g. 802.11a, 11b, 11g, 11n, etc.). More specifically, the Wi-Fi I/F 20 supports a WFD (abbreviation of Wi-Fi Direct (registered trademark)) scheme formulated by a Wi-Fi Alliance. The WFD scheme is a wireless communication scheme described in "Wi-Fi Peer-to-Peer (P2P) Technical Specification Version 1.1" prepared by the Wi-Fi Alliance.

The Wi-Fi I/F 20 is set to any one of an OFF state, a Standby state, and an ON state. The OFF state of the Wi-Fi I/F 20 is a state in which power is not being supplied to the Wi-Fi I/F 20, that is, the state in which a Wi-Fi communication cannot be performed. The Standby state of the Wi-Fi I/F 20 is the state in which power is being supplied to the Wi-Fi I/F 20, but it is not possible to perform the Wi-Fi communication. The Standby state of the Wi-Fi I/F 20 can also be described as the state in which it is possible to receive a radio wave via the Wi-Fi I/F 20, but without being able to ensure sufficient communication speed, it is substantially not possible to perform the Wi-Fi communication. The ON state of the Wi-Fi I/F 20 is the state in which sufficient power is being supplied to the Wi-Fi I/F 20, and it is possible to perform the Wi-Fi communication. An amount of power being supplied to the Wi-Fi I/F 20 in the ON state (i.e. power consumption) is greater than the amount of power supplied to the Wi-Fi I/F 20 in the Standby state.

The BT I/F 22 is an I/F for performing a wireless communication according to a Bluetooth scheme (hereinafter called "BT communication"). The Bluetooth scheme, for example, is a wireless communication scheme based on IEEE standard 802.15.1, and standards conforming thereto. More specifically, the BT I/F 22 supports BLE (abbreviation of Bluetooth Low Energy). The BLE is a standard that is realized using version 4.0 or a later version of the Bluetooth scheme. Hereinafter, Bluetooth version lower than 4.0 will be called "classic BT". In order for a BT communication to be performed according to BLE between a pair of BT I/Fs, one BT I/F may support "Bluetooth Smart Ready" established using the BT scheme, and the other BT I/F may support "Bluetooth Smart Ready" or "Bluetooth Smart" established using the BT scheme. A BT I/F that supports "Bluetooth Smart Ready" is an I/F that is capable of performing both a BLE operation and a classic BT operation (i.e. a so-called dual mode I/F). A BT I/F that supports "Bluetooth Smart" is an I/F that is capable of performing the BLE operation, but is not capable of performing the classic BT operation. In the present embodiment, the BT communication according to BLE is performed between the MFP 10 and the portable terminals 50, 90, and 100. Then, since the BT I/F (e.g. reference sign 62) of the portable terminals 50, 90, and 100, which will be explained below, supports "Bluetooth Smart Ready", the BT I/F 22 of the MFP 10 may support either "Bluetooth Smart Ready" or "Bluetooth Smart". However, in a modification, in the case where the BT I/F 22 of the MFP 10 supports "Bluetooth Smart Ready", the BT I/Fs of the portable terminals 50, 90, and 100 may support "Bluetooth Smart".

Different points between classic BT and BLE will be described. A number of BLE channels (i.e. 40) is smaller than the number of classic BT channels (i.e. 79). Current consumption at the time of a BLE data communication (e.g. 15 mA) is lower than the current consumption at the time of a classic BT data communication (e.g. 35 mA). Therefore, BLE power consumption is lower than classic BT power consumption. Also, an Advertise signal is used in BLE, but the Advertise signal is not used in classic BT.

Different points between the Wi-Fi scheme and the BT scheme will be described. A communication speed of the Wi-Fi communication (e.g. a maximum communication speed of 600 Mbps) is faster than the communication speed of the BT communication (e.g. a maximum communication speed of 24 Mbps). A frequency of a carrier wave in the Wi-Fi communication is either a 2.4 GHz band or a 5.0 GHz band. The frequency of the carrier wave in the BT communication is the 2.4 GHz band. That is, in the case where the 5.0 GHz band is used as the carrier wave frequency in the Wi-Fi communication, the carrier wave frequency in the Wi-Fi communication differs from the carrier wave frequency in the BT communication. Furthermore, the maximum distance over which the Wi-Fi communication can be performed (e.g. approximately 100 m) is greater than the maximum distance over which the BT communication can be performed (e.g. roughly several tens of meters).

The BT I/F 22 is constantly maintained in the ON state while the power supply to the MFP 10 is ON. (i.e. power is constantly supplied to the BT I/F 22, and the state in which the BT communication is possible is maintained). The power consumption of the BT I/F 22 in the ON state (i.e. the power consumption of BLE) is lower than the power consumption of the Wi-Fi I/F 20 in the ON state, and the power consumption of an NFC I/F 24 in the ON state.

The NFC I/F 24 is an I/F for performing a wireless communication according to an NFC scheme (hereinafter called "NFC communication"). The NFC I/F 24 comprises a memory 26. The NFC scheme is a wireless communication scheme for a so-called near field wireless communication, and, for example, is a wireless communication scheme based on international standard ISO/IEC 21481 or 18092. The communication speed of the NFC communication (e.g. a maximum communication speed of 424 Kbps) is slower than the communication speed of the BT communication (e.g. a maximum communication speed of 24 Mbps). In the NFC communication, the frequency of the carrier wave (e.g. a 13.56 MHz band) differs from that of the Wi-Fi communication (e.g. either the 2.4 GHz band or the 5.0 GHz band) and that of the BT communication (e.g. the 2.4 GHz band). Also, the maximum distance over which the NFC communication can be performed (e.g. approximately 10 cm) is shorter than the maximum distance over which the BT communication can be performed (e.g. approximately several tens of meters).

As types of I/Fs for performing the NFC communication, an I/F called an NFC forum device, and an I/F called an NFC forum tag are known. In the present embodiment, the NFC I/F 24 functions as an NFC forum device. In a modification, the NFC I/F 24 may function as the NFC forum tag. The NFC forum device is an I/F that can selectively operate in any of a P2P (abbreviation of Peer To Peer) mode, a R/W (abbreviation of Reader/Writer) mode, and a CE (abbreviation of Card Emulation) mode. The NFC forum tag is not an I/F that can selectively operate in any of the aforementioned three modes, but rather is an I/F that functions solely as an IC (abbreviation of Integrated Circuit) tag. Because the NFC forum tag is not an I/F that can selectively operate in any of the aforementioned three modes, the NFC forum tag has a simpler configuration than the NFC forum device. That is, IC chip configuration is simple. In general, an IC chip that functions as the NFC forum tag is less expensive than an IC chip that functions as the NFC forum device.

The NFC I/F 24, similar to the Wi-Fi I/F 20, is also set to any one of the OFF state, the Standby state, and the ON state. In the present embodiment, the Wi-Fi I/F 20 and the NFC I/F 24 are always set to the same state. The OFF state of the NFC I/F 24 is the state in which power is not being supplied to the NFC I/F 24, that is, the state in which the NFC communication cannot be performed. The Standby state of the NFC I/F 24 is the state in which power is being supplied to the NFC I/F 24, but it is not possible to perform the NFC communication. The Standby state of the NFC I/F 24 can also be described as the state in which a radio wave can be received via the NFC I/F 24, but without being able to ensure sufficient communication speed, it is substantially not possible to perform the NFC communication. The ON state of the NFC I/F 24 is the state in which sufficient power is being supplied to the NFC I/F 24, and the NFC communication is able to be performed. The amount of power being supplied to the NFC I/F 24 in the ON state (i.e. power consumption) is greater than the amount of power supplied to the NFC I/F 24 in the Standby state.

The controller 30 comprises a CPU 32 and a memory 34. The CPU 32 executes various processes in accordance with a program 36 stored in the memory 34. The memory 34 is configured with a volatile memory and a nonvolatile memory. The memory 34 is configured to store a device name "NM" indicating the MFP 10 in advance. In addition, the memory 34 is configured to store a list 40 for managing the device information related to a portable terminal (e.g. portable terminal 50 etc.) that is performing the BT communication with the MFP 10. The list 40 includes the device information in which a device name, a flag, and a timer value are combined. The device name (e.g. "N1") indicates the device name of a portable terminal (e.g. portable terminal 50). The flag (e.g. "Standby") is information associated with the portable terminal having the device name in an I/F controlling process, which will be described below. The flag is information related to the states of the Wi-Fi I/F 20 and the NFC I/F 24. The timer value (e.g. "T1") indicates a count value of a timer associated with the device name and the flag. By the CPU 32 executing the I/F controlling process described below (refer to FIGS. 3 and 4), the device information is added to the list 40. Further, by the CPU 32 executing a list administration process described below (refer to FIG. 5), the device information in the list 40 is maintained, updated, or deleted.

(Configuration of Portable Terminals 50, 90, and 100)

Each of the portable terminals 50, 90, and 100, for example, is a portable terminal device such as a mobile telephone (e.g. a smart phone), a PDA (abbreviation of Personal Digital Assistant), laptop PC (abbreviation of Personal Computer), a tablet PC, a portable music player, and a portable video player. The configuration of the portable terminal 50 will be explained below, but portable terminals 90 and 100 basically comprise the same configuration as that of portable terminal 50.

The portable terminal 50 comprises an operation unit 52, a display unit 54, a Wi-Fi I/F 60, a BT I/F 62, an NFC I/F 64, and a controller 70. Each of the units 52 to 70 is connected to a bus line (reference sign omitted).

The operation unit 52 comprises a plurality of keys. A user can input various instructions into the portable terminal 50 by operating the operation unit 52. The display unit 54 is a display for displaying various types of information. The display unit 54 also functions as a so-called touch panel (i.e. also functions as an operation unit). The Wi-Fi I/F 60 is the I/F for performing the Wi-Fi communication. The Wi-Fi I/F 60 may or may not support WFD. The BT I/F 62 is the I/F for performing the BT communication, and supports BLE. The NFC I/F 64 is the I/F for performing the NFC communication. The differences between the respective I/Fs 60, 62, and 64 are the same as the differences between the respective I/Fs 20, 22, and 24 of the MFP 10.

The controller 70 comprises a CPU 72 and a memory 74. The CPU 72 executes various processes in accordance with an OS program 76 stored in the memory 74. The memory 74 is configured with a volatile memory and a nonvolatile memory and the like. The memory 74 is configured to not only store the OS program 76, but also an application program 78 for causing a function (e.g. a print function) to be performed on the MFP 10. The application program 78, for example, may be installed in the portable terminal 50 from an Internet server provided by a vendor of the MFP 10, or may be installed in the portable terminal 50 from storage media shipped together with the MFP 10. The memory 74 is also configured to store in advance the device name "N1" for identifying the portable terminal 50. Furthermore, the portable terminals 90 and 100 respectively stores device names "N2" and "N3".

The memory 74 also has an activation information storing area 80 and an instruction information storing area 82. The activation information storing area 80 is an area for storing activation information indicating that the application program 78 has been activated in the case where the aforementioned application 78 program has been activated. The CPU 72 causes the activation information to be stored in the activation information storing area 80 when the application 78 program is activated. The instruction information storing area 82 is an area for storing instruction information indicating that a function performing instruction (e.g. a print instruction) for causing the MFP 10 to perform a function has been inputted. The CPU 72 causes the instruction information to be stored in the instruction information storing area 82 when the function performing instruction is inputted by the user after activation of the application program 78.

(Configuration of AP 110)

The AP 110 is a device for forming a Wi-Fi network. The MFP 10 and the portable terminal 50 etc. can belong to the Wi-Fi network formed by the AP 110 as slaves (specifically, stations). For example, in the case where the MFP 10 and the portable terminal 50 belong to the Wi-Fi network formed by the AP 110, the AP 110 can relay the Wi-Fi communication between the MFP 10 and the portable terminal 50.

Figure 2:
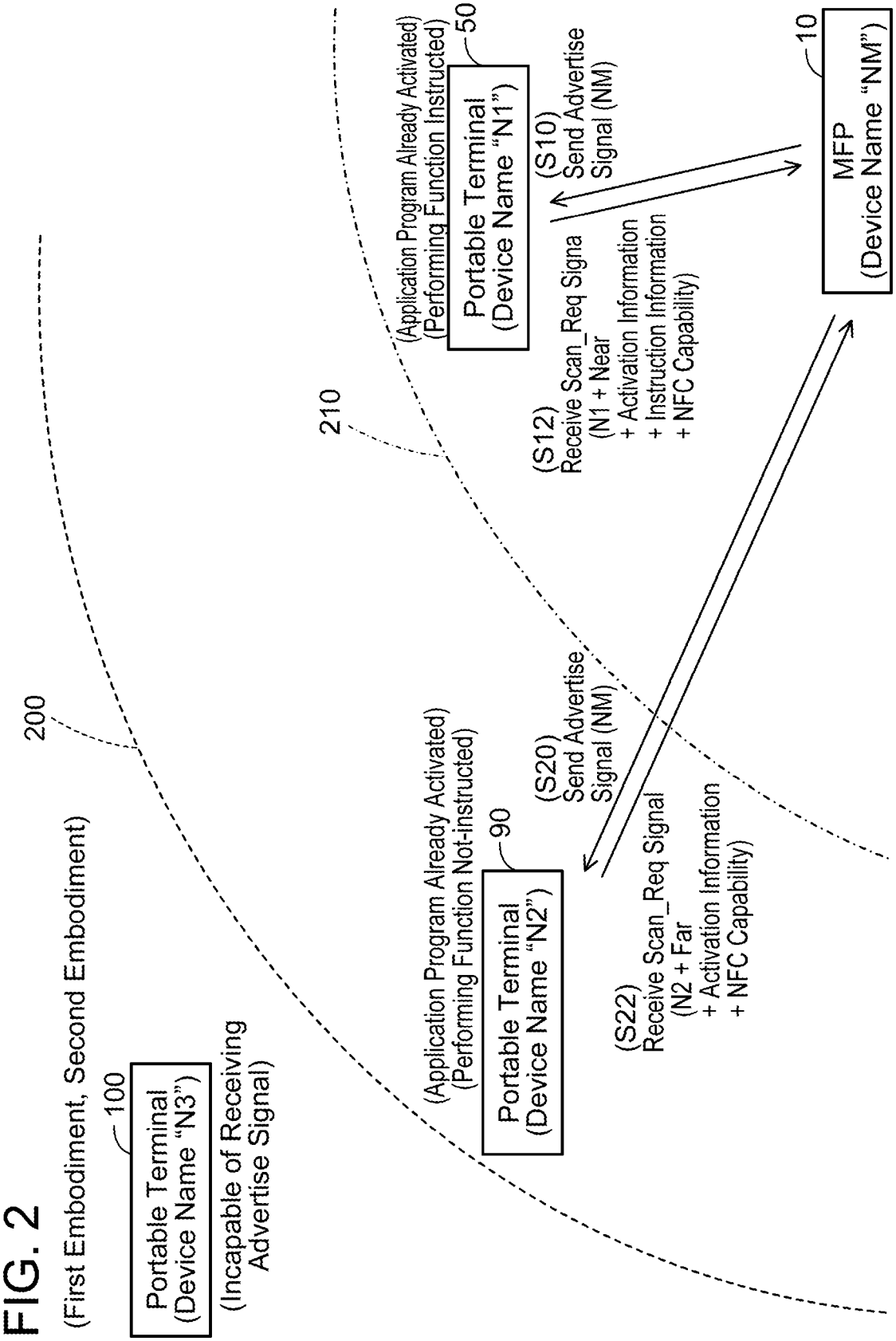
FIG. 2 schematically shows a basic process executed by a controller of an MFP.

(Basic Process of MFP 10; FIG. 2)

Next, the basic process executed by the CPU 32 of the MFP 10 will be explained by referring to FIG. 2. When the MFP 10 power supply is ON, the CPU 32 repeatedly performs a broadcast transmission of the Advertise signal via the BT I/F 22 within a communication range 200 of the BT I/F 22 (i.e. the range reached by the radio wave) (S10, S12). The Advertise signal includes the device name "NM" of the MFP 10. The CPU 32 sends the Advertise signal to the exterior without establishing a Bluetooth logical link (i.e. a Bluetooth-scheme wireless connection).

In the example of FIG. 2, the portable terminal 50 exists within a range 210 of the communication range 200 of the BT I/F 22 of the MFP 10. The range 210 is the range that is near the MFP 10. Also, in the portable terminal 50, the application program 78 has been activated, and the function performing instruction has already been inputted. That is, the activation information is stored in the activation information storing area 80, and the instruction information is stored in the instruction information storing area 82 of the memory 74 of the portable terminal 50. The CPU 72 of the portable terminal 50 receives the Advertise signal (S10) from the MFP 10 via the BT I/F 62. At this occasion, the CPU 72 can measure an intensity of the radio wave when the Advertise signal is received. Next, the CPU 72 determines whether or not the distance between the portable terminal 50 and the MFP 10 is relatively near, by determining whether or not the measured radio wave intensity exceeds a predetermined threshold. In the example of FIG. 2, as described hereinabove, the portable terminal 50 exists within the range 210 that is near the MFP 10. Therefore, the value of the radio wave intensity when the CPU 72 receives the Advertise signal is higher than the predetermined threshold. Therefore, the CPU 72 determines that the distance between the portable terminal 50 and the MFP 10 is relatively near. In this case, the CPU 72 causes the device name "NM" and a distance information "Near", indicating that the distance between the portable terminal 50 and the MFP 10 is relatively near to be stored in the memory 74 in an associated manner. Next, the CPU 72 sends a Scan Request signal (hereinafter written as "Scan_Req signal") to the MFP 10 via the BT I/F 62. The Scan_Req signal is a unicast signal sent from the portable terminal that received the Advertise signal.

In S12, the CPU 32 of the MFP 10 receives the Scan_Req signal from the portable terminal 50 via the BT I/F 22. In particular, the CPU 32 is able to receive the Scan_Req signal without establishing a logical link. The Scan_Req signal received in S12 includes the device name "N1" of the portable terminal 50 that is the source of the Scan_Req signal, the distance information "Near" indicating that the distance between the portable terminal 50 and the MFP 10 is relatively near, the activation information, the instruction information, and NFC Capability information. The NFC Capability information is information indicating that the portable terminal 50 is able to perform the NFC communication.

Furthermore, in the example of FIG. 2, the portable terminal 90 exists within the communication range 200 of the BT I/F 22 of the MFP 10, but exists within a range that is far from the MFP 10 (i.e. outside of the range 210). Also, although the application program 78 has been activated in the portable terminal 90, the function performing instruction has not been inputted yet. That is, the activation information has been stored in the memory (not shown in the drawing) of the portable terminal 90, but the instruction information has not been stored. Similar to the case of the portable terminal 50, the portable terminal 90 receives the Advertise signal (S20) from the MFP 10. In this occasion, the value of the radio wave intensity when the portable terminal 90 receives the Advertise signal is lower than the predetermined threshold. Therefore, the portable terminal 90 determines that the distance between the portable terminal 90 and the MFP 10 is relatively far. The portable terminal 90 associates the device name "NM" and the distance information "Far" indicating that the distance between the portable terminal 90 and the MFP 10 is relatively far, and causes the same to be stored in the memory (not shown in the drawing) of the portable terminal 90. Next, the portable terminal 90 sends the Scan-Req signal to the MFP 10.

In S22, the CPU 32 of the MFP 10 receives the Scan_Req signal from the portable terminal 90 via the BT I/F 22. The Scan_Req signal received in S22 includes the device name "N2" of the portable terminal 90, the distance information "Far", the activation information, and the NFC Capability information. As described hereinabove, the Scan_Req signal of S22 does not include the instruction information because the function performing instruction has not been inputted in the portable terminal 90.

In the example of FIG. 2, the portable terminal 100 exists outside the communication range 200 of the BT I/F 22 of the MFP 10. The portable terminal 100 is thus not able to receive the Advertise signal from the MFP 10. Therefore, the CPU 32 of the MFP 10 does not receive the Scan_Req signal from the portable terminal 100.

The CPU 32 repeatedly executes the aforementioned processes while the power supply to the MFP 10 is ON.

Figure 3:
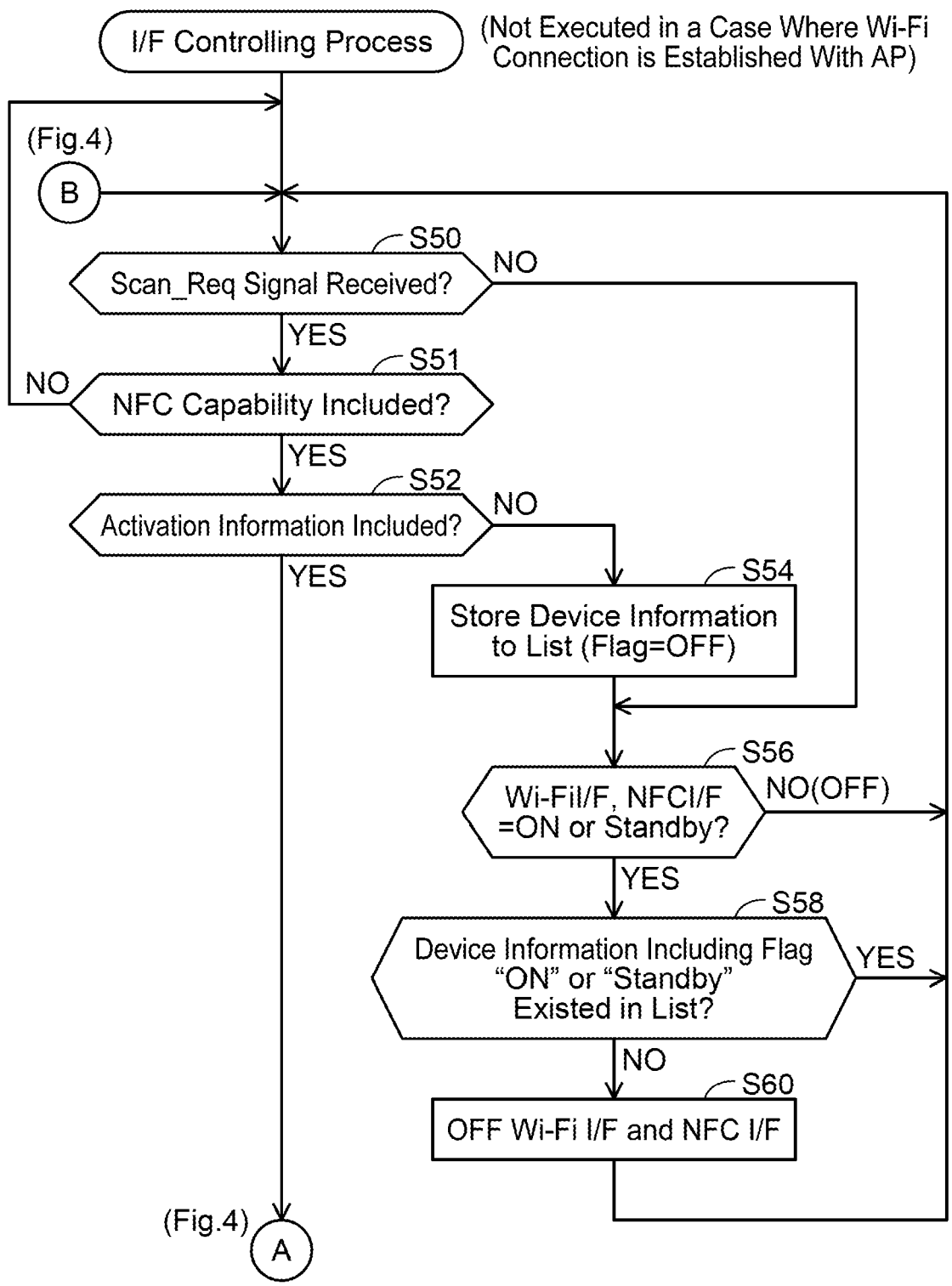
FIG. 3 shows a flowchart of an interface controlling process executed by the controller of the MFP of a first embodiment.

(I/F Controlling Process of MFP 10; FIGS. 3 and 4)

Next, the I/F controlling process executed by the CPU 32 of the MFP 10 will be explained by referring to FIGS. 3 and 4. The CPU 32 starts the process of FIGS. 3 and 4 when the power supply to the MFP 10 is turned ON. However, the CPU 32 does not execute the process of FIGS. 3 and 4 in the case where a Wi-Fi connection has already been established between the MFP 10 and the AP 110 (refer to FIG. 1) (i.e. the case where the MFP 10 already belongs as a station to the Wi-Fi network formed by the AP 110). The CPU 32 maintains the Wi-Fi I/F 20 and the NFC I/F 24 in the ON state while the Wi-Fi connection is established between the MFP 10 and the AP 110.

In S50, the CPU 32 determines whether or not the Scan_Req signal has been received from any of the portable terminals (e.g. portable terminal 50). As described above, the portable terminal that exists within the communication range 200 of the BT I/F 22 of the MFP 10 (see FIG. 2) sends the Scan_Req signal to the MFP 10 in response to receiving the Advertise signal from the MFP 10. In this case, the CPU 32 receives the Scan_Req signal from the portable terminal via the BT I/F 22. The CPU 32, upon receiving the Scan_Req signal, makes a determination of YES in S50, and proceeds to S51. On the other hand, in the case where the Scan_Req signal is not received, the CPU 32 makes a determination of NO in S50, and proceeds to S56.

In S51, the CPU 32 determines whether or not the received Scan_Req signal includes the NFC Capability information. When the portable terminal that is the source of the Scan_Req signal is able to perform the NFC communication, the Scan_Req signal includes the NFC Capability information (refer to FIG. 2). When the portable terminal that is the source of the Scan_Req signal is not able to perform the NFC communication, the Scan_Req signal does not include the NFC Capability information. In the case where the received Scan_Req signal includes the NFC Capability information, the CPU 32 makes the determination of YES in S51, and proceeds to S52. On the other hand, in the case where the received Scan_Req signal does not include the NFC Capability information, the CPU 32 makes the determination of NO in S51, and returns to S50.

In S52, the CPU 32 determines whether or not the received Scan_Req signal includes the activation information. In the case where an application program (e.g. the application program 78) is activated on the portable terminal that is the source of the Scan_Req signal, the Scan_Req signal includes the activation information (refer to FIG. 2). In the case where the application program has not been activated on the portable terminal that is the source of the Scan_Req signal, the Scan_Req signal does not include the activation information. In the case where the received Scan_Req signal includes the activation information, the CPU 32 makes the determination of YES in S52, and proceeds to S70 of FIG. 4. On the other hand, in the case where the received Scan_Req signal does not include the start information, the CPU 32 makes the determination of NO in S52, and proceeds to S54.

In S54, the CPU 32 causes the device information to be stored in the list 40. The device information stored in S54 includes the device name included in the received Scan_Req signal, the flag "OFF", and the timer value (e.g. "T1" of FIG. 1). When the content of the flag is other than "OFF" in the case where device information that includes the same device name as the device name already included in the Scan_Req signal at the stage of S54 exists in the list 40, the CPU 32 changes the content of the flag to "OFF" (i.e. updates the device information). On the other hand, when the content of the flag is "OFF", the CPU 32 maintains the content of the flag as "OFF" (i.e. maintains the device information). In S54, in the case where the CPU 32 has caused the device information including the device name included in the Scan_Req signal to be stored anew in the list 40, the CPU 32 starts the count of the timer value (e.g. "T1" of FIG. 1) included in the device information. When S54 ends, the process proceeds to S56.

In S56, the CPU 32 determines whether or not the Wi-Fi I/F 20 and the NFC I/F 24 are both in either the ON state or the Standby state. In the case where the Wi-Fi I/F 20 and the NFC I/F 24 are in either the ON state or the Standby state, the CPU 32 makes the determination of YES in S56, and proceeds to S58. On the other hand, in the case where the Wi-Fi I/F 20 and the NFC I/F 24 are both in the OFF state, the CPU 32 makes the determination of NO in S56, and returns to S50.

In S58, the CPU 32 determines whether or not device information that includes either the "ON" or "Standby" flag exists in the list 40. In the case where even one piece of device information associated with either the "ON" or "Standby" flag exists in the list 40, the CPU 32 makes the determination of YES in S58, and returns to S50. On the other hand, in the case where only device information that is associated with the "OFF" flag exists in the list 40, or the case where no device information exists in the list 40, the CPU 32 makes the determination of NO in S58, and proceeds to S60.

In S60, the CPU 32 changes the Wi-Fi I/F 20 and the NFC I/F 24 from the ON state (or the Standby state) to the OFF state. Specifically, the CPU 32 stops the supply of power to the Wi-Fi I/F 20 and the NFC I/F 24. When S60 ends, the process returns to S50.

In S70 of FIG. 4, the CPU 32 determines whether or not the Scan_Req signal received in the case of YES in S50 of FIG. 3 includes the instruction information. In the case where the function performing instruction (e.g. the print function) has been inputted to the portable terminal that is the source of the Scan_Req signal, the Scan_Req signal includes the instruction information (refer to FIG. 2). In the case where the function performing instruction has not been inputted to the portable terminal that is the source of the Scan_Req signal, the Scan_Req signal does not include the instruction information (refer to FIG. 2). In the case where the Scan_Req signal includes the instruction information, the CPU 32 makes the determination of YES in S70, and proceeds to S72. On the other hand, in the case where the Scan_Req signal does not include the instruction information, the CPU 32 makes the determination of NO in S70, and proceeds to S80.

In S72, the CPU 32 determines whether or not the received Scan_Req signal includes the distance information "Near". In the case where the portable terminal that is the source of the Scan_Req signal exists relatively near the MFP 10, the Scan_Req signal includes the distance information "Near" (refer to FIG. 2). In the case where the portable terminal that is the source of the Scan_Req signal exists relatively far from the MFP 10, the Scan_Req signal includes the distance information "Far" (refer to FIG. 2). In the case where the Scan_Req signal includes the distance information "Near", the CPU 32 makes the determination of YES in S72, and proceeds to S74. On the other hand, in the case where the Scan_Req signal includes the distance information "Far", the CPU 32 makes the determination of NO in S72, and proceeds to S82.

In S74, the CPU 32 causes the device information to be stored in the list 40. The device information stored in S74 includes the device name included in the received Scan_Req signal, the "ON" flag, and the timer value. Furthermore, at the stage of S74, when the content of the flag is other than "ON" in the case where device information including the same device name as the device name included in the Scan_Req signal already exists in the list 40, the CPU 32 changes the content of the flag to "ON" (i.e. updates the device information). On the other hand, when the content of the flag is "ON", the CPU 32 maintains the content of the flag as "ON" (i.e. maintains the device information). In S74, in the case where the CPU 32 caused the device information including the device name included in the Scan_Req signal to be stored anew in the list 40, the CPU 32 starts the count of the timer value (e.g. "T1" of FIG. 1) included in the device information. When S74 ends, the process proceeds to S76.

In S76, the CPU 32 changes the Wi-Fi I/F 20 and the NFC I/F 24 from either the OFF state or the Standby state to the ON state. Specifically, the CPU 32 supplies a high amount of power to the Wi-Fi I/F 20 and the NFC I/F 24. In the case where the Wi-Fi I/F 20 and the NFC I/F 24 are already in the ON state, the CPU 32 maintains the Wi-Fi I/F 20 and the NFC I/F 24 in the ON state. When the Wi-Fi I/F 20 is changed to the ON state, the CPU 32 also automatically shifts the operating state of the MFP 10 from a WFD device state to a G/O (abbreviation of Group Owner) state without performing a WFD G/O negotiation. When the operating state of the MFP 10 shifts to the G/O state, the CPU 32 forms a wireless network that has the MFP 10 as the G/O (i.e. a WFD network). The CPU 32 also generates a SSID (abbreviation of Service Set IDentifier) and a password by randomly generating character strings. Hereinbelow, the SSID and the password may be called "network information". The network information (i.e. the SSID and the password) is information used in the aforementioned WFD network.

Next, in S77, the CPU 32 causes the network information generated in S76 to be stored in the memory 26 of the NFC I/F 24. When S77 ends, the process returns to S50 in FIG. 3.

In S80, the CPU 32 determines whether or not the received Scan_Req signal includes the distance information "Near". The content of the process of S80 is the same as that of S72. In the case of YES in S80, the process proceeds to S82. In the case of NO in S80, the process proceeds to S90.

In S82, the CPU 32 causes the device information to be stored in the list 40. The device information stored in S82 includes the device name included in the received Scan_Req signal, the "Standby" flag, and the timer value. Furthermore, at the stage of S82, when the content of the flag is other than "Standby" in the case where device information including the same device name as the device name included in the Scan_Req signal already exists in the list 40, the CPU 32 changes the content of the flag to "Standby" (i.e. updates the device information). When the content of the flag is "Standby", the CPU 32 maintains the content of the flag as "Standby" (i.e. maintains the device information). In S82, in the case where the CPU 32 has caused the device information including the device name included in the Scan_Req signal to be stored anew in the list 40, the CPU 32 starts the count of the timer value (e.g. "T1" of FIG. 1) included in the device information. When S82 ends, the process proceeds to S84.

In S84, the CPU 32 determines whether or not the Wi-Fi I/F 20 and the NFC I/F 24 are both in either the ON state or the OFF state. In the case where the Wi-Fi I/F 20 and the NFC I/F 24 are in either the ON state or the OFF state, the CPU 32 makes the determination of YES in S84, and proceeds to S86. On the other hand, in the case where the Wi-Fi I/F 20 and the NFC I/F 24 are both in the Standby state, the CPU 32 makes the determination of NO in S84, and returns to S50 of FIG. 3.

In S86, the CPU 32 determines whether or not device information including the "ON" flag exists in the list 40. In the case where device information associated with the "ON" flag exists in the list 40, the CPU 32 makes the determination of YES in S86, and returns to S50 of FIG. 3. On the other hand, in the case where only device information associated with either the "OFF" flag or the "Standby" flag exists in the list 40, the CPU 32 makes the determination of NO in S86, and proceeds to S88.

In S88, the CPU 32 changes the Wi-Fi I/F 20 and the NFC I/F 24 from the OFF state (or the ON state) to the Standby state. Specifically, the CPU 32 supplies a lower amount of power to the Wi-Fi I/F 20 and the NFC I/F 24 than in the ON state. When S88 ends, the process returns to S50 of FIG. 3.

The respective processes of S90 to S96 are the same as the processes of S54 to S60 of FIG. 3. As such, a detailed explanation will be omitted. In the case of NO in S92, in the case of YES in S94, or in the case where S96 ends, the CPU 32 returns to S50 of FIG. 3.

(List Administration Process; FIG. 5)

Next, a list administration process executed by the CPU 32 of the MFP 10 will be explained by referring to FIG. 5. When the power supply to the MFP 10 is turned ON, the CPU 32 starts the process of FIG. 5 together with the above-described process of FIGS. 3 and 4. However, the same as in the case of the process of FIGS. 3 and 4, the CPU 32 does not execute the process of FIG. 5 in the case where the Wi-Fi connection has already been established between the MFP 10 and the AP 110.

In S100, the CPU 32 determines whether or not the Scan_Req signal was received from any of the portable terminals (e.g. portable terminal 50). Upon receiving the Scan_Req signal, the CPU 32 makes the determination of YES in S100, and proceeds to S102. On the other hand, in the case where the Scan_Req signal is not received, the CPU 32 makes the determination of NO in S100, and proceeds to S108.

In S102, the CPU 32 determines whether or not the received Scan_Req signal includes the activation information. In the case where the received Scan_Req signal includes the activation information, the CPU 32 makes the determination of YES in S102, and proceeds to S104. On the other hand, in the case where the received Scan_Req signal does not include the activation information, the CPU 32 makes the determination of NO in S102, and proceeds to S108.

In S104, the CPU 32 determines whether or not device information including the same device name as the device name included in the received Scan_Req signal exists in the list 40. In the case where device information (hereinafter called "specific device information") including the same device name as the device name included in the Scan_Req signal already exists in the list 40, the CPU 32 makes the determination of YES in S104, and proceeds to S106. On the other hand, in the case where the specific device information does not exist in the list 40, the CPU 32 makes the determination of NO in S104, skips S106, and returns to S100.

In S106, the CPU 32 resets the timer value (e.g. "T1" of FIG. 1) included in the specific device information. After resetting the timer value included in the specific device information, the CPU 32 once again starts the count of the timer value. When S106 ends, the process returns to S100.

In S108, the CPU 32 determines whether or not the device information exists in the list 40. In the case where even one piece of device information exists in the list 40, the CPU 32 makes the determination of YES in S108, and proceeds to S110. On the other hand, in the case where no device information exists in the list 40, the CPU 32 makes the determination of NO in S108, and returns to S100.

In S110, the CPU 32 determines whether or not any of one or more timer values included in one or more pieces of device information that exist in the list 40 are equal to or greater than a predetermined threshold TH. In the case where device information that includes a timer value equal to or greater than the predetermined threshold TH exists in the list 40, the CPU 32 makes the determination of YES in S110, and proceeds to S112. On the other hand, in the case where device information that includes a timer value equal to or greater than the predetermined threshold TH does not exist in the list 40, the CPU 32 makes the determination of NO in S110, and returns to S100.

In S112, the CPU 32 deletes the device information including the timer value that is equal to or greater than the predetermined threshold TH from the list 40. When S112 ends, the process returns to S100.

(Summary of Contents of Flags Included in Device Information; FIG. 6)

The content of the flag included in the device information (i.e. any of "ON", "Standby", or "OFF") when the CPU 32 causes the device information to be stored in the list 40 (S54 of FIG. 3, S74 of FIGS. 4, S82, and S90) in the I/F controlling process of the present embodiment (refer to FIGS. 3 and 4) will be explained in summary form by referring to FIG. 6. As shown in FIG. 6, a flag having content that differs for each condition of the portable terminal is included in the device information.

[Condition 1] In the case where the Scan_Req signal includes the instruction information (YES in S70 of FIG. 4) and includes the distance information "Near" (YES in S72), the "ON" flag is included in the device information (S74).

[Condition 2] In the case where the Scan_Req signal includes the instruction information (YES in S70 of FIG. 4), and includes the distance information "Far" (NO in S72), the "Standby" flag is included in the device information (S82).

[Condition 3] In the case where the Scan_Req signal includes the activation information but not the instruction information (YES in S52 of FIG. 3, NO in S70 of FIG. 4), and includes the distance information "Near" (YES in S80), the "Standby" flag is included in the device information (S82).

[Condition 4] In the case where the Scan_Req signal includes the activation information but not the instruction information (YES in S52 of FIG. 3, NO in S70 of FIG. 4), and includes the distance information "Far" (NO in S80), the "OFF" flag is included in the device information (S90).

[Condition 5] In the case where the Scan_Req signal does not include the activation information (NO in S52 of FIG. 3), the "OFF" flag is included in the device information regardless of the content of the distance information (S54).

[Condition 6] Furthermore, in the case where the Scan_Req signal has not been received (i.e. "No response" in the drawing; NO in S50 of FIG. 3), the CPU 32 does not cause the device information to be stored in the list 40.

Figure 8:
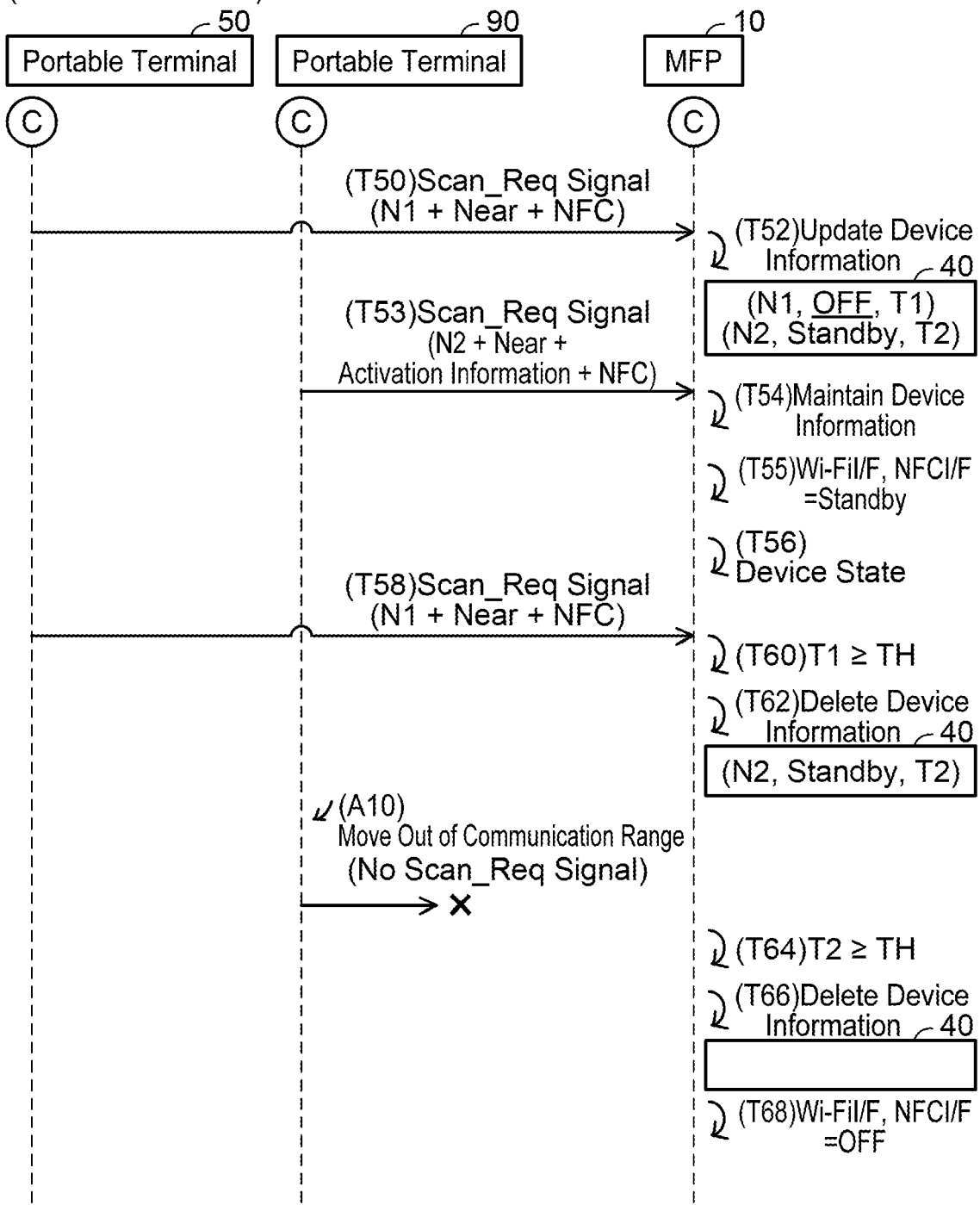
FIG. 8 is a continuation of the sequence chart of FIG. 7.

(Specific Case; FIGS. 7 and 8)

Next, a specific case realized by the processes of FIGS. 2 to 5 will be explained by referring to FIGS. 7 and 8. In FIGS. 7 and 8, thin line arrows, broken line arrows, and thick line arrows between the portable terminals 50 and 90 and the MFP 10 indicate BT communications, NFC communications, and Wi-Fi communications, respectively.

In the initial state of the present case, the MFP 10 has not established the Wi-Fi connection with the AP 110. The power supply to the MFP 10 is ON, and the BT I/F 22 is in the ON state, but both the Wi-Fi I/F 20 and the NFC I/F 24 are in the OFF state. The MFP 10 repeatedly performs a broadcast transmission of the Advertise signal via the BT I/F 22 within the communication range of the BT I/F 22 (S10 and S12 of FIG. 2). In the initial state, no device information is stored in the list 40 in the memory 34 of the MFP 10.

In A1, a print instruction for performing printing on the MFP 10 is inputted to the portable terminal 50 by the user of the portable terminal 50. The print instruction includes specifying of the target data to be printed. Furthermore, at the time point at which the print instruction is inputted to the portable terminal 50, the application program 78 has already been activated on the portable terminal 50. Thereafter, the portable terminal 50 receives the Advertise signal from the MFP 10 at a location that is relatively far from the MFP 10 (i.e. at a location that is outside of the range 210 but within the communication range 200 of FIG. 2.). Upon receiving the Advertise signal from the MFP 10, in T10, the portable terminal 50 sends the MFP 10 the Scan_Req signal. The Scan_Req signal in T10 includes the device name "N1", the distance information "Far", the activation information, the instruction information, and the NFC Capability information.

Upon receiving the Scan_Req signal (T10) from the portable terminal 50, in T12, the MFP 10 causes the device information to be stored in the list 40 (YES in S70, NO in S72, and S82 of FIG. 4). The device information stored in the list 40 at this occasion includes the device name "N1" of the portable terminal 50, the "Standby" flag, and the timer value "T1". The MFP 10 starts the count of the timer value "T1". Next, in T14, the MFP 10 changes the Wi-Fi I/F 20 and the NFC I/F 24 from the OFF state to the Standby state (S88 of FIG. 4).

Thereafter, in A2, an application activation instruction is inputted to the portable terminal 90 by the user of the portable terminal 90. The application program is activated in the portable terminal 90 in accordance therewith. Furthermore, the function performing instruction (e.g. the print instruction) is not inputted to the portable terminal 90 at this stage. Thereafter, the portable terminal 90 receives the Advertise signal from the MFP 10 at a location relatively near the MFP 10 (i.e. a location within the range 210 of FIG. 2). Upon receiving the Advertise signal from the MFP 10, in T16, the portable terminal 90 sends the Scan_Req signal to the MFP 10. The Scan_Req signal in T16 includes the device name "N2", the distance information "Near", the activation information, and the NFC Capability information.

Upon receiving the Scan_Req signal (T16) from the portable terminal 90, in T18, the MFP 10 causes the device information to be stored in the list 40 (NO in S70, YES in S80, and S82 of FIG. 4). The device information stored in the list 40 at this time includes the device name "N2" of the portable terminal 90, the "Standby" flag, and the timer value "T2". The MFP 10 starts the count of the timer value "T2". Next, in T20, the MFP 10 maintains the Wi-Fi I/F 20 and the NFC I/F 24 in the Standby state (NO in S84 of FIG. 4).

Thereafter, in A3, the user of the portable terminal 50 moves the portable terminal 50 to a location relatively near the MFP 10. The portable terminal 50 receives the Advertise signal from the MFP 10 at the location that is relatively near the MFP 10. Upon receiving the Advertise signal from the MFP 10, in T22, the portable terminal 50 sends the Scan_Req signal to the MFP 10. The Scan_Req signal in T22 includes the device name "N1", the distance information "Near", the activation information, the instruction information, and the NFC Capability information. The distance information changes from "Far" to "Near" in line with the portable terminal 50 having been moved to a location relatively near the MFP 10.

Upon receiving the Scan_Req signal (T22) from the portable terminal 50, in T24, the MFP 10 updates the device information in the list 40 (YES in S70, YES in S72, and S74 of FIG. 4). Specifically, the MFP 10 changes the flag of the device information that includes the device name "N1" from "Standby" to "ON". The MFP 10 also resets the timer value "T1" (S106 of FIG. 5). Next, in T26, the MFP 10 changes the Wi-Fi I/F 20 and the NFC I/F 24 from the Standby state to the ON state (S76 of FIG. 4). Next, in T28, the MFP 10 automatically shifts the operating state of the MFP 10 from the WFD device state to the G/O state (S76). Then, in T29, the MFP 10 generates the network information (i.e. the SSID and the password), and causes the generated network information to be stored in the memory 26 of the NFC I/F 24 (S77).

Thereafter, in A4, the user of the portable terminal 50 brings the portable terminal 50 near the MFP 10. When the distance between the NFC I/F 24 of the MFP 10 and the NFC I/F 64 of the portable terminal 50 becomes less than the distance over which the NFC communication can be performed (e.g. 10 cm), in T30, an NFC communication session is established between these I/Fs. In this case, the portable terminal 50 uses the NFC communication session to receive the network information stored in the memory 26 of the NFC I/F 24.

Thereafter, in T32, the portable terminal 50 uses the received network information to establish the Wi-Fi connection with the MFP 10. Specifically, the portable terminal 50 participates as a client in the Wi-Fi network (i.e. the WFD network) formed by the MFP 10, which is the G/O. Consequently, a Wi-Fi communication session is established between the Wi-Fi I/F 20 of the MFP 10 and the Wi-Fi I/F 62 of the portable terminal 50. Thereafter, the portable terminal 50 uses the Wi-Fi communication session to send the target data to be printed to the MFP 10. The MFP 10 performs a printing of an image represented by the target data on the print performing unit 16.

The processes performed between the portable terminal 50 and the MFP 10 in T30 and T32 are disclosed in detail in US Patent Application Publication No. 2013/260682, and this document is incorporated by reference herein.

Thereafter, in A5, a terminate application instruction is inputted to the portable terminal 50 by the user of the portable terminal 50. The application program is terminated in the portable terminal 50 in accordance therewith. Thereafter, the portable terminal 50 once again receives the Advertise signal from the MFP 10 at a location relatively near the MFP 10. Upon receiving the Advertise signal from the MFP 10, in T50 of FIG. 8, the portable terminal 50 sends the Scan_Req signal to the MFP 10. The Scan_Req signal in T50 includes the device name "N2", the distance information "Near", and the NFC Capability information. Since the application program has ended, neither the activation information nor the instruction information is included in the Scan_Req signal.

Upon receiving the Scan_Req signal (T50) from the portable terminal 50, in T52, the MFP 10 updates the device information in the list 40 (NO in S52, and S54 of FIG. 3). Specifically, the MFP 10 changes the flag of the device information including the device name "N1" from "ON" to "OFF". Because the Scan_Req signal does not include the activation information, the MFP 10 does not reset the timer value "T1" (NO in S102 of FIG. 5).

In the case where the Advertise signal is once again received from the MFP 10 at a location relatively near the MFP 10, in T53, the portable terminal 90 again sends the Scan_Req signal to the MFP 10. The Scan_Req signal in T53 includes the device name "N2", the distance information "Near", the activation information, and the NFC Capability information the same as in T16 of FIG. 7.

Upon receiving the Scan_Req signal (T53) from the portable terminal 90, in T54, the MFP 10 maintains the device information in the list 40 (NO in S70, YES in S80, and S82 of FIG. 4). Specifically, the MFP 10 maintains the flag of the device information including the device name "N2" as "Standby". The MFP 10 also resets the timer value "T2" (S106 of FIG. 5). Next, in T55, the MFP 10 changes the Wi-Fi I/F 20 and the NFC I/F 24 from the ON state to the Standby state (YES in S84, NO in S86, and S88 of FIG. 4). Consequently, in T56, the MFP 10 changes the operating state of the MFP 10 from the G/O state to the device state.

Thereafter, in the case where the Advertise signal is once again received from the MFP 10 at a location relatively near the MFP 10, in T58, the portable terminal 50 again sends the Scan_Req signal to the MFP 10. The Scan_Req signal in T58 includes the device name "N2", the distance information "Near", and the NFC Capability information the same as in T50.

The MFP 10 receives the Scan_Req signal (T58) from the portable terminal 50, but since the Scan_Req signal does not include the activation information, the MFP 10 does not reset the timer value "T1" (NO in S102 of FIG. 5).

Thereafter, in T60, the MFP 10 determines that the timer value "T1" in the list 40 is equal to or greater than the predetermined threshold TH (YES in S110 of FIG. 5). Next, in T62, the MFP 10 deletes the device information corresponding to the timer value "T1" (i.e. the device information including the device name "N1") from the list 40 (S112 of FIG. 5).

Thereafter, in A10, the user of the portable terminal 90 moves the portable terminal 90 outside the communication range of the BT I/F 22 of the MFP 10 (outside the communication range 200 of FIG. 2). Consequently, the portable terminal 90 is unable to receive the Advertise signal from the MFP 10. Therefore, the portable terminal 90 no longer sends the Scan_Req signal to the MFP 10.

Thereafter, in T64, the MFP 10 determines that the timer value "T2" in the list 40 has reached a value equal to or greater than the predetermined threshold TH (YES in S110 of FIG. 5). Next, in T66, the MFP 10 deletes the device information corresponding to the timer value "T2" (i.e. the device information including the device name "N2") from the list 40 (S112 of FIG. 5). As a result of this, no more device information exists in the list 40. Therefore, in T68, the MFP 10 changes the Wi-Fi I/F 20 and the NFC I/F 24 from the Standby state to the OFF state (YES in S56, NO in S58, and S60 of FIG. 3).

Effects of the Present Embodiment

In the present embodiment, as shown in the example of FIGS. 7 and 8, the MFP 10 is able to set the Wi-Fi I/F 20 and the NFC I/F 24 to an appropriate state in accordance with the content of the information included in the Scan_Req signal received from the portable terminal 50 and so forth. Therefore, the MFP 10 is able to realize power savings by setting the Wi-Fi I/F 20 and the NFC I/F 24 to the appropriate state in accordance with the condition of the portable terminal 50 and so forth.

For example, in the case where the Scan_Req signal including the distance information "Far", the activation information, and the instruction information is received from the portable terminal 50 etc. while the Wi-Fi I/F 20 and the NFC I/F 24 are in the OFF state, the MFP 10 changes the Wi-Fi I/F 20 and the NFC I/F 24 from the OFF state to the Standby state (refer to T10 to T14 of FIG. 7, YES in S70, NO in S72, and S80 of FIG. 4). Also, in the case where the Scan_Req signal including the distance information "Near", the activation information, and the instruction information is received from the portable terminal 50 etc. while the Wi-Fi I/F 20 and the NFC I/F 24 are in the OFF state (or the Standby state), the MFP 10 changes the Wi-Fi I/F 20 and the NFC I/F 24 from the OFF state (or the Standby state) to the ON state (refer to YES in S70, YES in S72, and S76 of FIG. 4). On the other hand, in the case where the Scan_Req signal that includes neither the activation information nor the instruction information is received from the portable terminal 50 etc. while the Wi-Fi I/F 20 and the NFC I/F 24 are in the OFF state (NO in S52 of FIG. 3), the MFP 10 maintains the Wi-Fi I/F 20 and the NFC I/F 24 in the OFF state (NO in S56). Also, in the case where the Scan_Req signal that includes the distance information "Near" and the activation information, but does not include the instruction information is received from the portable terminal 50 etc. while the Wi-Fi I/F 20 and the NFC I/F 24 are in the Standby state (NO in S70, and YES in S80 of FIG. 4), or the case where the Scan_Req signal including the distance information "Far" and the instruction information is received from the portable terminal 50 etc. while the Wi-Fi I/F 20 and the NFC I/F 24 are in the Standby state (YES in S70, and NO in S72 of FIG. 4), the MFP 10 maintains the Wi-Fi I/F 20 and the NFC I/F 24 in the Standby state (NO in S84). In the case where the application program 78 is activated in the portable terminal 50, there is a relatively high likelihood of a communication of target data to be printed being performed thereafter between the MFP 10 and the portable terminal 50. Also, in the case where the print instruction has already been inputted to the portable terminal 50, there is an even higher likelihood of a communication of target data to be printed being performed thereafter between the MFP 10 and the portable terminal 50. Therefore, as described hereinabove, in the present embodiment, the MFP 10 is able to set each I/F to the appropriate state in accordance with whether or not the application program 78 is activated in the portable terminal 50, and whether or not the function performing instruction has already been inputted to the portable terminal 50.

Furthermore, as described hereinabove, in the case where the Scan_Req signal including the distance information "Far", the activation information, and the instruction information is received from the portable terminal 50 etc. while the Wi-Fi I/F 20 and the NFC I/F 24 are in the OFF state, the MFP 10 changes the Wi-Fi I/F 20 and the NFC I/F 24 from the OFF state to the Standby state (refer to T10 to T14 of FIG. 7, YES in S70, NO in S72, and S88 of FIG. 4). In addition, in the case where the Scan_Req signal including the distance information "Near", the activation information, and the instruction information is received from the portable terminal 50 etc. while the Wi-Fi I/F 20 and the NFC I/F 24 are in the Standby state, the MFP 10 changes the Wi-Fi I/F 20 and the NFC I/F 24 from the Standby state to the ON state (refer to T22 to T26 of FIG. 7, YES in S70, YES in S72, and S76 of FIG. 4). Normally, there is a higher likelihood of a communication of target data being performed thereafter between the MFP 10 and the portable terminal 50 in the case where the MFP 10 and the portable terminal 50 and so forth are relatively near one another than when the MPF 10 and the portable terminal 50 and so forth are relatively far from one another. That is, in the present embodiment, the MFP 10 is able to set each I/F to the appropriate state in accordance with whether or not the specific signal received while the Wi-Fi I/F 20 and the NFC I/F 24 are in the OFF state (or the Standby state) includes predetermined information, and whether or not the MFP 10 and the portable terminal 50 are relatively near one another at this time.

For example, in the case where the Scan_Req signal that includes neither the activation information nor the instruction information is received from the portable terminal 50 and so forth while the Wi-Fi I/F 20 and the NFC I/F 24 are in the ON state, the MFP 10 changes the Wi-Fi I/F 20 and the NFC I/F 24 from the ON state to the OFF state (or the Standby state) (refer to T50 to T55 of FIG. 8, NO in S52, and S60 of FIG. 3). Therefore, the MFP 10 is able to realize power savings by lowering the power supplied to the each of I/Fs under conditions where there is a relatively low likelihood of the communication of target data being performed with the portable terminal 50.

(Corresponding Relationships)

The MFP 10, the portable terminals 50, 90, 100, and the AP 110, respectively, are examples of "a communication apparatus", "a first external apparatus" and "a second external apparatus". The Wi-Fi I/F 20, the BT I/F 22, and the NFC I/F 24, respectively, are examples of "a first interface", "a second interface" and "a third interface". The OFF state of the Wi-Fi I/F 20 is an example of "a first stage". The Standby state and the ON state of the Wi-Fi I/F 20 are both examples of "a second state". The OFF state of the NFC I/F 24 is an example of "a third state". The Standby state and the ON state of the NFC I/F 24 are both examples of "a fourth state". The Standby state of the Wi-Fi I/F 20 is also an example of "a first state". The Standby state of the NFC I/F 24 is also an example of "a third state". The Standby state of the Wi-Fi I/F 20 is also an example of "a first type of state". The ON state of the Wi-Fi I/F 20 is also an example of "a second type of state". The activation information and the instruction information are examples of "predetermined information". The Scan_Req signal is an example of "a specific signal". The Advertise signal is an example of "a predetermined signal". The G/O state of the WFD is an example of "a parent state".

S12 and S22 of FIG. 2 are examples of "receiving a specific signal". S60 of FIG. 3, and S76, S88, and S96 of FIG. 4 are examples of "changing a state" and "maintaining the state". T30 and T32 of FIG. 7 are examples of "performing a communication". S76 of FIG. 4 is an example of "changing an operating state". S77 is an example of the process executed for "sending network information". S10 and S20 of FIG. 2 are examples of the process executed for "sending repeatedly a predetermined signal".

Second Embodiment

A second embodiment will be explained by focusing on the points of difference from the first embodiment. In the present embodiment, the NFC I/F 24 may or may not be provided in the MFP 10. Also, the NFC I/F 64 may or may not be provided in the portable terminal 50. The Scan_Req signal that is sent to the MFP 10 from the portable terminal 50 etc. may or may not include the NFC Capability information. Therefore, an explanation as to whether or not the NFC Capability information is included in the Scan_Req signal in the present embodiment will be omitted hereinbelow (refer to FIGS. 11 and 12). Furthermore, in the present embodiment, the CPU 32 of the MFP 10 executes the list administration process (refer to FIG. 5) the same as in the first embodiment.

Figure 9:
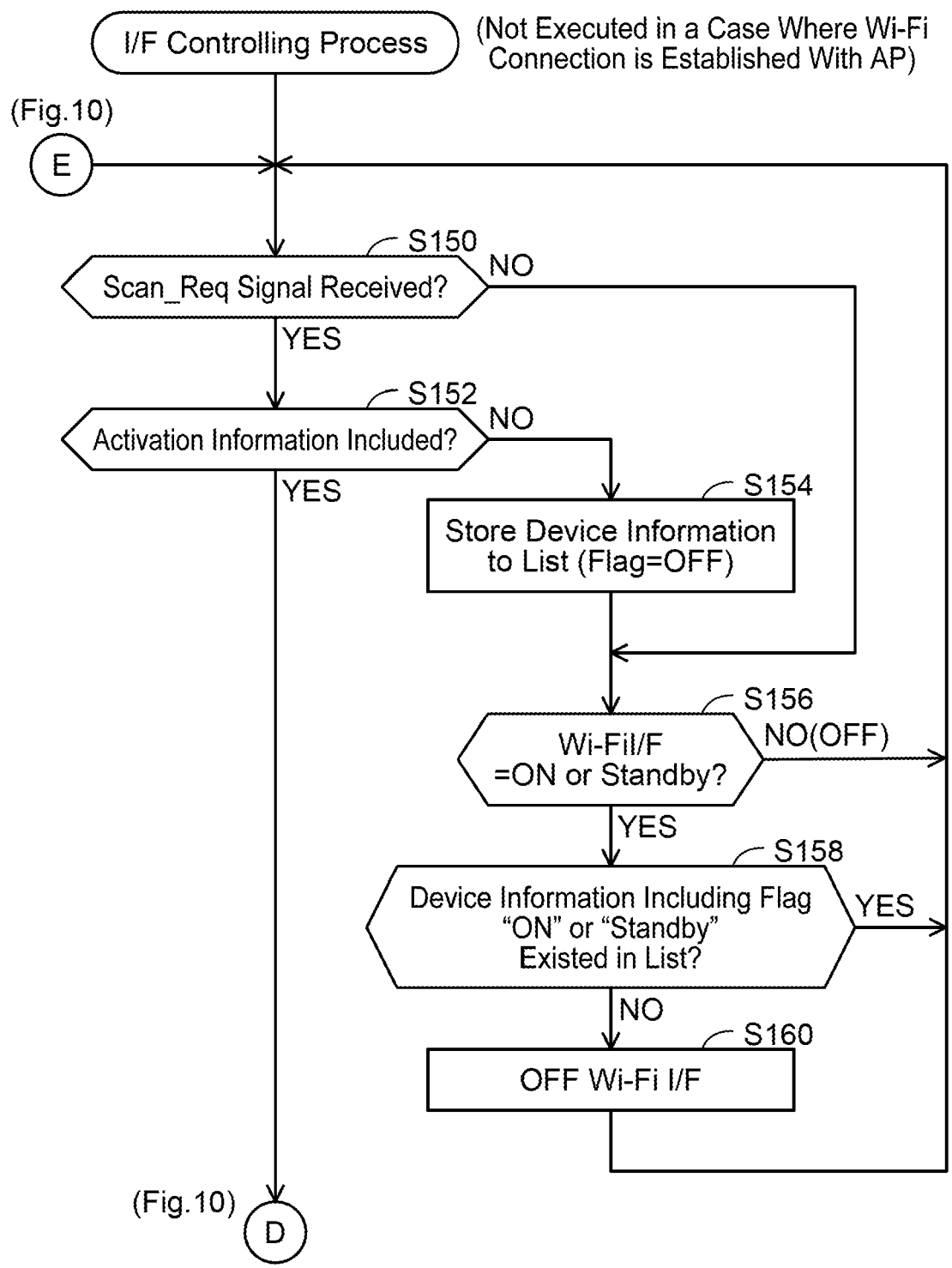
FIG. 9 shows a flowchart of an interface controlling process by the controller of the MFP in the second embodiment.

(I/F Controlling Process of MFP 10; FIGS. 9 and 10)

In the present embodiment, the content of the I/F controlling process executed by the CPU 32 of the MFP 10 differs from that of the first embodiment. The I/F controlling process executed by the CPU 32 of the MFP 10 of the present embodiment will be explained below by referring to FIGS. 9 and 10. The CPU 32 starts the process of FIGS. 9 and 10 when the power supply to the MFP 10 is turned ON. However, the CPU 32 does not execute the process of FIGS. 9 and 10 in the case where the Wi-Fi connection has been established between the MFP 10 and the AP 110 (refer to FIG. 1) (i.e. the case where the MFP 10 already belongs as a station to the Wi-Fi network formed by the AP 110). The CPU 32 maintains the Wi-Fi I/F 20 and the NFC I/F 24 in the ON state while the Wi-Fi connection is established between the MFP 10 and the AP 110.

In S150, the CPU 32 determines whether or not the Scan_Req signal has been received from any of the portable terminals (e.g. portable terminal 50). The CPU 32, upon receiving the Scan_Req signal, makes the determination of YES in S150, and proceeds to S152. On the other hand, in the case where the Scan_Req signal is not received, the CPU 32 makes the determination of NO in S150, and proceeds to S156.

In S152, the CPU 32 determines whether or not the received Scan_Req signal includes the activation information. In the case where the received Scan_Req signal includes the activation information, the CPU 32 makes the determination of YES in S152, and proceeds to S170 of FIG. 10. On the other hand, in the case where the received Scan_Req signal does not include the activation information, the CPU 32 makes the determination of NO in S152, and proceeds to S154.

In S154, the CPU 32 causes the device information to be stored in the list 40. The device information stored in S154 includes the "OFF" flag. Since the content of the process of S154 is the same as that of S54 of FIG. 3, a detailed explanation will be omitted. When S154 ends, the process proceeds to S156.

In S156, the CPU 32 determines whether or not the Wi-Fi I/F 20 is in the ON state or the Standby state. In the case where the Wi-Fi I/F 20 is in either the ON state or the Standby state, the CPU 32 makes the determination of YES in S156, and proceeds to S158. On the other hand, in the case where the Wi-Fi I/F 20 is in the OFF state, the CPU 32 makes the determination of NO in S156, and returns to S150.

In S158, the CPU 32 determines whether or not device information that includes either the "ON" or "Standby" flag exists in the list 40. In the case where even one piece of device information associated with either the "ON" or "Standby" flag exists in the list 40, the CPU 32 makes the determination of YES in S158, and returns to S150. On the other hand, in the case where only device information that is associated with the "OFF" flag exists in the list 40, or the case where no device information exists in the list 40, the CPU 32 makes the determination of NO in S158, and proceeds to S160.

In S160, the CPU 32 changes the Wi-Fi I/F 20 from the ON state (or the Standby state) to the OFF state. When S160 ends, the process returns to S150.

In S170 of FIG. 10, the CPU 32 determines whether or not the Scan_Req signal received in the case of YES in S150 of FIG. 9 includes the instruction information. In the case where the Scan_Req signal includes the instruction information, the CPU 32 makes the determination of YES in S170, and proceeds to S174. On the other hand, in the case where the Scan_Req signal does not include the instruction information, the CPU 32 makes the determination of NO in S170, and proceeds to S182.

In S174, the CPU 32 causes the device information to be stored in the list 40. The device information stored in S174 includes the "ON" flag. Since the content of the process of S174 is the same as that of S74 of FIG. 4, a detailed explanation will be omitted. When S174 ends, the process proceeds to S176.

In S176, the CPU 32 changes the Wi-Fi I/F 20 from either the OFF state or the Standby state to the ON state. When the state of the Wi-Fi I/F 20 is changed to the ON state, the CPU 32 also automatically shifts the operating state of the MFP 10 from the WFD device state to the G/O state. When the operating state of the MFP 10 shifts to the G/O state, the CPU 32 forms a wireless network that has the MFP 10 as the G/O (i.e. a WFD network). The CPU 32 also generates the network information (i.e. the SSID and the password).

Next, in S177, the CPU 32 performs a unicast transmission via the BT I/F 22 of a Scan Response (hereinafter called "Scan_Res signal") including the network information generated in S176 to the portable terminal, which is the source of the Scan_Req signal. That is, the Scan_Res signal is the response signal to the Scan_Req signal. When S177 ends, the process returns to S150 in FIG. 9.

In S182, the CPU 32 causes the device information to be stored in the list 40. The device information stored in S182 includes the "Standby" flag. Since the content of the process of S182 is the same as that of S82 of FIG. 4, a detailed explanation will be omitted. When S182 ends, the process proceeds to S184.

In S184, the CPU 32 determines whether or not the Wi-Fi I/F 20 is in the ON state or the OFF state. In the case where the Wi-Fi I/F 20 is in either the ON state or the OFF state, the CPU 32 makes the determination of YES in S184, and proceeds to S186. On the other hand, in the case where the Wi-Fi I/F 20 is in the Standby state, the CPU 32 makes the determination of NO in S184, and returns to S150 of FIG. 9.

In S186, the CPU 32 determines whether or not device information including the "ON" flag exists in the list 40. In the case where device information associated with the "ON" flag exists in the list 40, the CPU 32 makes the determination of YES in S186, and returns to S150 of FIG. 9. On the other hand, in the case where only device information associated with either the "OFF" flag or the "Standby" flag exists in the list 40, the CPU 32 makes the determination of NO in S186, and proceeds to S188.

In S188, the CPU 32 changes the state of the Wi-Fi I/F 20 from the OFF state (or the ON state) to the Standby state. When S188 ends, the process returns to S150 of FIG. 9.

(Summary of Contents of Flags Included in Device Information; FIG. 6)

The content of the flag included in the device information when the CPU 32 causes the device information to be stored in the list 40 (S154 of FIG. 9, and S174 and S182 of FIG. 10) in the I/F controlling process of the present embodiment (refer to FIGS. 9 and 10) will be explained in summary form by referring to FIG. 6. As shown in FIG. 6, in the present embodiment as well, a flag having content that differs for each condition of the portable terminal is included in the device information.

[Condition 1] In the case where the Scan_Req signal includes the instruction information (YES in S170 of FIG. 10), the "ON" flag is included in the device information regardless of whether the distance information is "Near" or "Far" (S174).

[Condition 2] In the case where the Scan_Req signal includes the activation information but does not include the instruction information (NO in S170 of FIG. 10), the "Standby" flag is included in the device information regardless of whether the distance information is "Near" or "Far" (S182).

[Condition 3] In the case where the Scan_Req signal does not include the activation information (NO in S152 of FIG. 9), the "OFF" flag is included in the device information regardless of whether the distance information is "Near" or "Far" (S154).

[Condition 4] Furthermore, in the case where the Scan_Req signal has not been received (i.e. "No response" in the table; NO in S150 of FIG. 9), the CPU 32 does not cause the device information to be stored in the list 40.

(Specific Case; FIGS. 11 and 12)

Next, a specific case realized by the processes of FIGS. 2, 9, 10, and 5 will be explained by referring to FIGS. 11 and 12.

In the initial state of the present case, the MFP 10 has not established the Wi-Fi connection with the AP 110. The power supply to the MFP 10 is ON and the BT I/F 22 is in the ON state, but the Wi-Fi I/F 20 is in the OFF state. The MFP 10 repeatedly performs a broadcast transmission of the Advertise signal via the BT I/F 22 within the communication range of the BT I/F 22 (S10 and S12 of FIG. 2). In the initial state, no device information is stored in the list 40 in the memory 34 of the MFP 10.

In A20, the application activation instruction is input to the portable terminal 50 by the user of the portable terminal 50. Consequently, the application program 78 is activated in the portable terminal 50. The portable terminal 50 receives the Advertise signal from the MFP 10 at a location that is relatively far from the MFP 10. Upon receiving the Advertise signal from the MFP 10, in T100, the portable terminal 50 sends the Scan_Req signal to the MFP 10. The Scan_Req signal in T100 includes the device name "N1", the distance information "Far", and the activation information.

Upon receiving the Scan_Req signal (T100) from the portable terminal 50, in T102, the MFP 10 causes the device information to be stored in the list 40 (NO in S170, and S182 of FIG. 10). The device information at this occasion includes the device name "N1" of the portable terminal 50, the "Standby" flag, and the timer value "T1". The MFP 10 starts the count of the timer value "T1". Next, in T104, the MFP 10 changes the state of the Wi-Fi I/F 20 from the OFF state to the Standby state (S188 of FIG. 10).

Thereafter, in A22, the application activation instruction is inputted to the portable terminal 90 by the user of the portable terminal 90. The application program is activated in the portable terminal 90 in accordance therewith. Thereafter, the portable terminal 90 receives the Advertise signal from the MFP 10 at a location relatively near the MFP 10. Upon receiving the Advertise signal from the MFP 10, in T106, the portable terminal 90 sends the Scan_Req signal to the MFP 10. The Scan_Req signal in T106 includes the device name "N2", the distance information "Near", and the activation information.

Upon receiving the Scan_Req signal (T106) from the portable terminal 90, in T108, the MFP 10 causes the device information to be stored in the list 40 (NO in S170, and S182 of FIG. 10). The device information at this occasion includes the device name "N2" of the portable terminal 90, the "Standby" flag, and the timer value "T2". The MFP 10 starts the count of the timer value "T2". Next, in T110, the MFP 10 maintains the Wi-Fi I/F 20 in the Standby state (NO in S184 of FIG. 10).

Thereafter, in A24, the print instruction is inputted to the portable terminal 50 by the user of the portable terminal 50. In this situation, the portable terminal 50 receives the Advertise signal from the MFP 10 at the location that is relatively far from the MFP 10. Upon receiving the Advertise signal from the MFP 10, in T112 the portable terminal 50 sends the Scan_Req signal to the MFP 10. The Scan_Req signal in T112 includes the device name "N1", the distance information "Far", the activation information, and the instruction information.

Upon receiving the Scan_Req signal (T112) from the portable terminal 50, in T114 the MFP 10 updates the device information in the list 40 (YES in S170, and S174 of FIG. 10). Specifically, the MFP 10 changes the flag of the device information including the device name "N1" from "Standby" to "ON". The MFP 10 also resets the timer value "T1" (S106 of FIG. 5). Next, in T116, the MFP 10 changes the state of the Wi-Fi I/F 20 from the Standby state to the ON state (S176 of FIG. 10). Next, in T118, the MFP 10 automatically shifts the operating state of the MFP 10 from the WFD device state to the G/O state (S176). Next, in T120, the MFP 10 generates the network information (i.e. the SSID and the password), and sends the Scan_Res signal including the generated network information to the portable terminal 50 (S177).

Thereafter, in T122, the portable terminal 50 uses the network information received from the MFP 10 to establish the Wi-Fi connection with the MFP 10. Specifically, the portable terminal 50 participates as a client in the Wi-Fi network (i.e. the WFD network) formed by the MFP 10, which is the G/O. Consequently, the Wi-Fi communication session is established between the Wi-Fi I/F 20 of the MFP 10 and the Wi-Fi I/F 62 of the portable terminal 50. Thereafter, the portable terminal 50 uses the Wi-Fi communication session to send the target data to be printed to the MFP 10. The MFP 10 causes the print performing unit 16 to perform the printing of the image represented by the target data.

The processes performed between the portable terminal 50 and the MFP 10 in T122 are also disclosed in detail in US Patent Application Publication No. 2013/260682, and this document is incorporated by reference herein.

Thereafter, in A26, the application termination instruction is inputted to the portable terminal 50 by the user of the portable terminal 50. The application program is terminated in the portable terminal 50 in accordance therewith. Thereafter, the portable terminal 50 once again receives the Advertise signal from the MFP 10 at a location relatively far from the MFP 10. Upon receiving the Advertise signal from the MFP 10, in T140 of FIG. 12, the portable terminal 50 sends the Scan_Req signal to the MFP 10. The Scan_Req signal in T140 includes the device name "N1", and the distance information "Far".

Upon receiving the Scan_Req signal (T140) from the portable terminal 50, in T142 the MFP 10 updates the device information in the list 40 (NO in S152, and S154 of FIG. 9). Specifically, the MFP 10 changes the flag of the device information including the device name "N1" from "ON" to "OFF". Because the Scan_Req signal does not include the activation information, the MFP 10 does not reset the timer value "T1" (NO in S102 of FIG. 5).

Upon once again receiving the Advertise signal from the MFP 10 at a location relatively near the MFP 10, in T143, the portable terminal 90 again sends the Scan_Req signal to the MFP 10. The Scan_Req signal in T143 includes the device name "N2", the distance information "Near", and the activation information the same as in T106 of FIG. 11.

Upon receiving the Scan_Req signal (T143) from the portable terminal 90, in T144 the MFP 10 maintains the device information in the list 40 (NO in S170, and S182 of FIG. 10). Specifically, the MFP 10 maintains the flag of the device information including the device name "N2" as "Standby". The MFP 10 also resets the timer value "T2" (S106 of FIG. 5). Next, in T145 the MFP 10 changes the state of the Wi-Fi I/F 20 from the ON state to the Standby state (S188 of FIG. 10). Consequently, in T146, the MFP 10 changes the operating state of the MFP 10 from the G/O state to the device state.

Upon once again receiving the Advertise signal from the MFP 10 at a location relatively far from the MFP 10, in T148, the portable terminal 50 again sends the Scan_Req signal to the MFP 10. The Scan_Req signal in T148 includes the device name "N1" and the distance information "Far" the same as in T140.

The MFP 10 receives the Scan_Req signal (T148) from the portable terminal 50, but since the Scan_Req signal does not include the activation information, the MFP 10 does not reset the timer value "T1" (NO in S102 of FIG. 5).

Thereafter, in T150, the MFP 10 determines that the timer value "T1" in the list 40 is equal to or greater than a predetermined threshold TH (YES in S110 of FIG. 5). Next, in T152 the MFP 10 deletes the device information corresponding to the timer value "T1" (i.e. the device information including the device name "N1") from the list 40 (S112 of FIG. 5).

Thereafter, in A30, the user of the portable terminal 90 moves the portable terminal 90 outside the communication range of the BT I/F 22 of the MFP 10 (outside the communication range 200 of FIG. 2). Consequently, the portable terminal 90 is unable to receive the Advertise signal from the MFP 10. Therefore, the portable terminal 90 no longer sends the Scan_Req signal to the MFP 10.

Thereafter, in T156, the MFP 10 determines that the timer value "T2" in the list 40 is equal to or greater than the predetermined threshold TH (YES in S110 of FIG. 5). Next, in T158 the MFP 10 deletes the device information corresponding to the timer value "T2" (i.e. the device information including the device name "N2") from the list 40 (S112 of FIG. 5). As a result of this, device information no longer exists in the list 40. Therefore, in T160 the MFP 10 changes the state of the Wi-Fi I/F 20 from the Standby state to the OFF state (YES in S156, NO in S158, and S160 of FIG. 9).

Effects of Present Embodiment

In the present embodiment as well, as exemplified in FIG. 9 and FIG. 10 the MFP 10 is also able to set the Wi-Fi I/F 20 to the appropriate state in accordance with the content of the information included in the Scan_Req signal received from the portable terminal 50 etc. Therefore, the MFP 10 is able to realize power savings by setting the Wi-Fi I/F 20 to the appropriate state in accordance with the condition of the portable terminal 50 etc.

(Corresponding Relationships)

S160 of FIG. 9 and S176 and S188 of FIG. 10 are examples of "changing a state" and "maintaining the state". T122 of FIG. 11 is an example of "performing a communication". S176 of FIG. 10 is an example of "changing an operating state". S177 is an example of "sending network information".

Specific examples of the present techniques have been described hereinabove, but these specific examples are merely illustrative, and do not limit the scope of the claims. The technical scope described in the claims includes various modifications and changes to the specific examples illustrated hereinabove. Modifications of the embodiments described hereinabove will be recited below.

(Modification 1) In the first embodiment described hereinabove, the CPU 32 of the MFP 10 switches the state of the Wi-Fi I/F 20 and the NFC I/F 24 in accordance with the content of the information included in the Scan_Req signal received from the portable terminal 50 and so forth. Not limited to this, and the CPU 32 of the MFP 10 may be configured to switch only the state of the NFC I/F 24 in accordance with the content of the information included in the Scan_Req signal received from the portable terminal 50 and so forth. In this modification, the Wi-Fi I/F 20 may normally be set to the ON state. In this modification, the CPU 32 may send the network information via the NFC I/F 24 the same as in the first embodiment described hereinabove. In this modification, in the case where the state of the NFC I/F 24 is changed to the ON state, the CPU 32 may cause the memory 26 of the NFC I/F 24 to store information required for user authentication that uses the NFC communication. In this modification, the CPU 32 may receive the information required for executing the user authentication on the MFP 10 from the portable terminal 50 and so forth or a card via the NFC I/F 24. In this modification, the NFC I/F 24 is an example of "a first interface".

(Modification 2) In the embodiments described hereinabove, the CPU 32 of the MFP 10 repeatedly sends the Advertise signal via the BT I/F 22. Not limited to this, and the portable terminal 50 etc. may each repeatedly send the Advertise signal to the exterior. In that case, the CPU 32 of the MFP 10 may receive the Advertise signal from the portable terminal 50 and so forth via the BT I/F 22. In this case, the Advertise signal may include the device name, the activation information, the instruction information, and the NFC Capability information. Also, based on the intensity of the radio wave at the time the Advertise signal is received, the CPU 32 may make the determination as to whether the distance between the MFP 10 and the portable terminal 50 and so forth is relatively near (i.e. distance information "Near") or relatively far (i.e. distance information "Far"). Thereafter, the CPU 32 may execute the processes (refer to FIGS. 2 to 5, FIG. 9, and FIG. 10) the same as in the embodiments described hereinabove. In this modification, the Advertise signal sent by the portable terminal 50 and so forth is an example of "a specific signal".

(Modification 3) In the first embodiment described hereinabove, the CPU 32 of the MFP 10 causes the network information (i.e. the SSID and the password) to be stored in the memory 26 of the NFC I/F 24 after changing the operating state of the MFP 10 to the G/O state (S76 and S77 of FIG. 4). Also, in the second embodiment, the CPU 32 sends the Scan_Res signal including the network information (i.e. the SSID and the password) to the portable terminal after changing the operating state of the MFP 10 to the G/O state (S176 and S177 of FIG. 10). Regarding this point, the aforementioned network information may include only the SSID, and need not include the password. In this case, the password may be the value already known to the user via another method. In this modification, the SSID is also an example of "network information".

(Modification 4) In the embodiments described hereinabove, it was explained that the Standby state of the Wi-Fi I/F 20 (or the NFC I/F 24) is the state in which it is possible to receive the radio wave via the Wi-Fi I/F 20 (or the NFC I/F 24), but is not possible to perform the Wi-Fi communication. Not limited to this, and the Standby state of the Wi-Fi I/F 20 (or the NFC I/F 24) may also be described as the state in which power is supplied to the Wi-Fi I/F 20 (or the NFC I/F 24), but it is not possible to receive the radio wave via the Wi-Fi I/F 20 (or the NFC I/F 24). In the case of this modification, the Standby state of the Wi-Fi I/F 20 and the Standby state of the NFC I/F 24, respectively, are examples of "a first state" and "a third state".

(Modification 5) The BT I/F 22 of the MFP 10 may be provided with a CPU and a memory. The memory of the BT I/F 22 may store a program. The CPU of the BT I/F 22 may be configured to be able to perform the operations of the embodiments described hereinabove in accordance with the program in the memory of the BT I/F 22 without receiving an instruction from the CPU 32 in the controller 30. Also, the NFC I/F 24 of the MFP 10 may be provided with a CPU. The memory 26 of the NFC I/F 24 may store a program. The CPU of the NFC I/F 24 may be configured to be able to perform the operations of the embodiments described hereinabove in accordance with the program in the memory 26 of the NFC I/F 24 without receiving an instruction from the CPU 32 in the controller 30. Also, the NFC I/F 24 of the MFP 10 need not be provided with a CPU and the memory 26. The NFC I/F 24 may be able to perform the operations of the embodiments described hereinabove by receiving an instruction from the CPU 32 in the controller 30. Generally speaking, the "first communication apparatus" may be provided with two or more processors (e.g. the CPU 32 in the controller 30 of the MFP 10 and the CPU in the BT I/F 22) and two or more memories (e.g. the memory 34 in the controller 30 and the memory in the BT I/F 22), and the processors may execute processes in accordance with the programs stored in the memories.

(Modification 6) In the embodiments described hereinabove, the case where the print instruction is inputted to the portable terminal 50 was explained. Not limited to this, and another function performing instruction for causing the MFP 10 to perform another function, such as a scan instruction, may be inputted to the portable terminal 50. For example, in the case where a scan instruction is inputted to the portable terminal 50, in T32 of FIG. 7 and T122 of FIG. 11, scan image data generated by the scan performing unit 18 performing a scan may be communicated between the MFP 10 and the portable terminal 50 instead of the target data to be printed. In this modification, the scan function is an example of "a specific function". The scan image data is an example of "target data".

(Modification 7) In the embodiments described hereinabove, in the case where the timer value included in the device information is equal to or greater than the predetermined threshold TH, the CPU 32 of the MFP 10 deletes the device information including the timer value from the list 40

(S112 of FIG. 5). The criterion for deleting the device information in the list 40 is not limited to the timer value, and an arbitrary criterion may be used. For example, the CPU 32 may be configured to delete the device information in the case where the Scan_Req signal is not received in response to a predetermined number of Advertise signals.

(Modification 8) In the second embodiment described hereinabove, the network information is included in the Scan_Res signal sent to the portable terminal 50 by the MFP 10 (refer to T120 of FIG. 11). Not limited to this, and the network information may be included in the Advertise signal that the MFP 10 repeatedly broadcasts via the BT I/F 22 within the communication range of the BT I/F 22.

(Modification 9) In the embodiments described hereinabove, the processes of FIGS. 2 to 5, FIG. 9 and FIG. 10 are realized using software (i.e. a program), but at least one of the processes of FIGS. 2 to 5, FIG. 9 and FIG. 10 may be realized using hardware, such as a logic circuit.

What is claimed is:

1. A printer comprising:
a print performing unit;
a WI-FI (registered trademark) interface configured to communicate according to a WI-FI (registered trademark) scheme;
a BLUETOOTH (registered trademark) interface configured to communicate according to version 4.0 or a later version of a BLUETOOTH (registered trademark) scheme;
a processor; and
a memory storing computer-readable instructions therein, the computer-readable instructions, when executed by the processor, causing the printer to perform:
while an operation state of the printer is a non-parent state, receiving a first unicast signal from an external apparatus via the BLUETOOTH (registered trademark) interface, the first unicast signal is sent from the external apparatus to the printer, wherein the non-parent state is different from a parent state, the parent state is a state where the printer operates as a parent station of a wireless network, and the wireless network is a network for performing a wireless communication via the WI-FI (registered trademark) interface;
in response to the first unicast signal being received, changing the operation state of the printer from the non-parent state to the parent state;
after the first unicast signal has been received, sending, to the external apparatus via the BLUETOOTH (registered trademark) interface, network information to be used in the wireless network;
after the operation state of the printer has been changed to the parent state and the network information has been sent, establishing a WI-FI (registered trademark) connection with the external apparatus via the WI-FI (registered trademark) interface so as to form the wireless network in which the printer operates as the parent station and to which both the printer and the external apparatus belong;
after the WI-FI (registered trademark) connection has been established, receiving, from the external apparatus via the WI-FI (registered trademark) interface by using the wireless network, target data to be printed, the target data being specified in an application program of the external apparatus;
in a case where the target data is received, causing the print performing unit to perform a printing of an image represented by the target data; and
in response to a second unicast signal being received from the external apparatus due to the application program of the external apparatus being terminated while the operation state of the printer is in the parent state and only both the printer and the external apparatus belong to the wireless network, changing the operation state of the printer from the parent state to the non-parent state.

2. The printer as in claim 1, wherein
the computer-readable instructions, when executed by the processor, cause the printer to further perform:
after the first unicast signal has been received, changing a state of the WI-FI (registered trademark) interface from an unavailable state to an available state.

3. The printer as in claim 2, wherein
the unavailable state of the WI-FI (registered trademark) interface is at least one of a state in which power is not being supplied to the WI-FI (registered trademark) interface and a Standby state, and
the available state of the WI-FI (registered trademark) interface is a state in which power is being supplied to the WI-FI (registered trademark) interface and is not the Standby state.

4. The printer as in claim 2, wherein
the unavailable state of the WI-FI (registered trademark) interface is a state in which it is not possible to receive a radio wave via the WI-FI (registered trademark) interface, and
the available state of the WI-FI (registered trademark) interface is a state in which it is possible to receive a radio wave via the WI-FI (registered trademark) interface.

5. The printer as in claim 1, further comprising
a scan performing unit,
wherein the computer-readable instructions, when executed by the processor, cause the printer to further perform:
after the WI-FI (registered trademark) connection has been established, receiving a scan instruction from the external apparatus via the WI-FI (registered trademark) interface by using the wireless network;
in a case where the scan instruction is received, causing the scan performing unit to perform a scanning; and
in a case where the scanning is performed, sending, to the external apparatus via the WI-FI (registered trademark) interface by using the wireless network, scan data created by the scanning.

6. The printer as in claim 1, wherein
the first unicast signal includes information indicating that the application program for causing the printer to perform the printing is being activated in the external apparatus.

7. The printer as in claim 1, wherein
the first unicast signal includes information indicating that a predetermined instruction has been inputted, through the application program for causing the printer to perform the printing, in the external apparatus.

8. The printer as in claim 7, wherein
the predetermined instruction is an instruction for causing the printer to perform the printing.

9. The printer as in claim 1, wherein
the version 4.0 or the later version of the BLUETOOTH (registered trademark) scheme is BLUETOOTH (registered trademark) Low Energy.

10. The printer as in claim 1, wherein
the first unicast signal is a Scan Request signal.

11. The printer as in claim 1, wherein
the first unicast signal is an Advertise signal.

12. The printer as in claim 1, wherein
the computer-readable instructions, when executed by the processor, further cause the printer to perform:
sending repeatedly, to an exterior via the BLUETOOTH (registered trademark) interface, a predetermined signal including identification information of the printer; and
after the external apparatus has received the predetermined signal from the printer, the first unicast signal is sent from the external apparatus to the printer.

13. The printer as in claim 1, wherein
the non-parent state is at least one of a device state according to WI-FI Direct (registered trademark), a state in which power is not being supplied to the WI-FI (registered trademark) interface, a Standby state of the WI-FI (registered trademark) interface, and an available state of the WI-FI (registered trademark) interface.

14. A non-transitory computer-readable medium storing a computer-readable instructions for a printer, wherein the computer-readable instructions, when executed by a processor of the printer, cause the printer to perform:
while an operation state of the printer is a non-parent state, receiving a first unicast signal from an external apparatus via a BLUETOOTH (registered trademark) interface of the printer, wherein the non-parent state is different from a parent state, the parent state is a state where the printer operates as a parent station of a wireless network, and the wireless network is a network for performing a wireless communication via a WI-FI (registered trademark) interface of the printer, the BLUETOOTH (registered trademark) interface configured to communicate according to version 4.0 or a later version of a BLUETOOTH (registered trademark) scheme, the WI-FI (registered trademark) interface configured to communicate according to a WI-FI (registered trademark) scheme;
in response to the first unicast signal being received, changing the operation state of the printer from the non-parent state to the parent state;
after the first unicast signal has been received, sending, to the external apparatus via the BLUETOOTH (registered trademark) interface, network information to be used in the wireless network;
after the operation state of the printer has been changed to the parent state and the network information has been sent, establishing a WI-FI (registered trademark) connection with the external apparatus via the WI-FI (registered trademark) interface so as to form the wireless network in which the printer operates as the parent station and to which both the printer and the external apparatus belong;
after the WI-FI (registered trademark) connection has been established, receiving, from the external apparatus via the WI-FI (registered trademark) interface by using the wireless network, target data to be printed, the target data being specified in an application program of the external apparatus;
in a case where the target data is received, causing a print performing unit of the printer to perform a printing of an image represented by the target data; and
in response to a second unicast signal being received from the external apparatus due to the application program of the external apparatus being terminated while the operation state of the printer is in the parent state and only both the printer and the external apparatus belong to the wireless network, changing the operation state of the printer from the parent state to the non-parent state.

15. The non-transitory computer-readable medium as in claim 14, wherein
the computer-readable instructions, when executed by the processor, cause the printer to further perform:
after the first unicast signal has been received, changing a state of the WI-FI (registered trademark) interface from an unavailable state to an available state.

16. The non-transitory computer-readable medium as in claim 15, wherein
the unavailable state of the WI-FI (registered trademark) interface is at least one of a state in which power is not being supplied to the WI-FI (registered trademark) interface and a Standby state, and
the available state of the WI-FI (registered trademark) interface is a state in which power is being supplied to the WI-FI (registered trademark) interface and is not the Standby state.

17. The non-transitory computer-readable medium as in claim 15, wherein
the unavailable state of the WI-FI (registered trademark) interface is a state in which it is not possible to receive a radio wave via the WI-FI (registered trademark) interface, and
the available state of the WI-FI (registered trademark) interface is a state in which it is possible to receive a radio wave via the WI-FI (registered trademark) interface.

18. The non-transitory computer-readable medium as in claim 14, wherein
the computer-readable instructions, when executed by the processor, cause the printer to further perform:
after the WI-FI (registered trademark) connection has been established, receiving a scan instruction from the external apparatus via the WI-FI (registered trademark) interface by using the wireless network;
in a case where the scan instruction is received, causing a scan performing unit of the printer to perform a scanning; and
in a case where the scanning is performed, sending, to the external apparatus via the WI-FI (registered trademark) interface by using the wireless network, scan data created by the scanning.

19. The non-transitory computer-readable medium as in claim 14, wherein
the first unicast signal includes information indicating that the application program for causing the printer to perform the printing is being activated in the external apparatus.

20. The non-transitory computer-readable medium as in claim 14, wherein
the first unicast signal includes information indicating that a predetermined instruction has been inputted, through the application program for causing the printer to perform the printing, in the external apparatus.

21. The non-transitory computer-readable medium as in claim 20, wherein
the predetermined instruction is an instruction for causing the printer to perform the printing.

22. The non-transitory computer-readable medium as in claim 14, wherein
the version 4.0 or the later version of the BLUETOOTH (registered trademark) scheme is BLUETOOTH (registered trademark) Low Energy.

23. The non-transitory computer-readable medium as in claim 14, wherein
the first unicast signal is a Scan Request signal.

24. The non-transitory computer-readable medium as in claim 14, wherein
the first unicast signal is an Advertise signal.

25. The non-transitory computer-readable medium as in claim 14, wherein
the computer-readable instructions, when executed by the processor, further cause the printer to perform:
sending repeatedly, to an exterior via the BLUETOOTH (registered trademark) interface, a predetermined signal including identification information of the printer; and
after the external apparatus has received the predetermined signal from the printer, the first unicast signal is sent from the external apparatus to the printer.

26. The non-transitory computer-readable medium as in claim 14, wherein
the non-parent state is at least one of a device state according to WI-FI Direct (registered trademark), a state in which power is not being supplied to the WI-FI (registered trademark) interface, a Standby state of the WI-FI (registered trademark) interface, and an available state of the WI-FI (registered trademark) interface.

27. A non-transitory computer-readable medium storing an application program including computer-readable instructions for an external apparatus, wherein
the external apparatus comprises:
a WI-FI (registered trademark) interface configured to communicate according to a WI-FI (registered trademark) scheme;
a BLUETOOTH (registered trademark) interface configured to communicate according to version 4.0 or a later version of a BLUETOOTH (registered trademark) scheme; and
a processor,
the computer-readable instructions, when executed by the processor, cause the external apparatus to perform:
receiving an instruction for specifying target data to be printed;
while an operation state of a printer is a non-parent state, sending a first unicast signal to the printer via the BLUETOOTH (registered trademark) interface, wherein the non-parent state is different from a parent state, the parent state is a state where the printer operates as a parent station of a wireless network, and the wireless network is a network for performing a wireless communication via the WI-FI (registered trademark) interface;
after the first unicast signal has been sent to the printer, receiving, from the printer via the BLUETOOTH (registered trademark) interface, network information to be used in the wireless network;
after the operation state of the printer has been changed to the parent state and the network information has been received due to the first unicast signal having been sent, establishing a WI-FI (registered trademark) connection with the printer via the WI-FI (registered trademark) interface so as to form the wireless network in which the printer operates as the parent station and to which both the printer and the external apparatus belong; and
after the WI-FI (registered trademark) connection has been established, sending, to the printer via the WI-FI (registered trademark) interface by using the wireless network, the target data so as to cause the printer to perform a printing of an image represented by the target image,
wherein while the operation state of the printer is in the parent state and only both the printer and the external apparatus belong to the wireless network, the operation state of the printer is changed from the parent state to the non-parent state in response to the external apparatus sending a second unicast signal to the printer due to the application program of the external apparatus being terminated.

\* \* \* \* \*